US008849210B2

(12) United States Patent
Mese et al.

(10) Patent No.: US 8,849,210 B2
(45) Date of Patent: *Sep. 30, 2014

(54) INTERFERENCE CONTROL IN A WIRELESS COMMUNICATION SYSTEM

(75) Inventors: Murat Mese, Rancho Palos Verdes, CA (US); Arak Sutivong, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/538,753

(22) Filed: Jun. 29, 2012

(65) Prior Publication Data

US 2012/0270582 A1 Oct. 25, 2012

Related U.S. Application Data

(63) Continuation of application No. 11/158,584, filed on Jun. 21, 2005.

(60) Provisional application No. 60/662,176, filed on Mar. 15, 2005.

(51) Int. Cl.
*H04B 15/00* (2006.01)
*H04B 1/00* (2006.01)
(Continued)

(52) U.S. Cl.
CPC .......... *H04W 52/24* (2013.01); *H04W 72/082* (2013.01); *H04L 1/00* (2013.01); *H04W 28/24* (2013.01); *H04B 17/005* (2013.01); *H04W 92/20* (2013.01); *H04W 52/146* (2013.01); *H04W 52/247* (2013.01); *H04W 52/362* (2013.01); *H04W 52/244* (2013.01); *H04W 52/265* (2013.01)
USPC .......... 455/63.1; 455/501; 455/67.13; 455/69

(58) Field of Classification Search
USPC .................. 455/522, 69, 63.1, 436, 453, 446, 455/422.1, 452.2, 509, 67.13, 67.11, 515, 455/126, 501; 370/252, 328, 329, 234, 331
See application file for complete search history.

(56) References Cited

U.S. PATENT DOCUMENTS

| 3,577,080 A | 5/1971 | Cannalte |
| 4,225,976 A | 9/1980 | Osborne et al. |

(Continued)

FOREIGN PATENT DOCUMENTS

| CA | 2340201 A1 | 1/2001 |
| CA | 2635291 A1 | 10/2007 |

(Continued)

OTHER PUBLICATIONS

Bowie, Song, et al., "Iterative Joint Channel Estimation and Signal Detection in MIMO OFDM Systems," Institute of Image Communication and Information Processing, Shanghai Jiao Tong University Shanghai, China, 2005, pp. 39-43.

(Continued)

*Primary Examiner* — John J Lee
(74) *Attorney, Agent, or Firm* — John J. Ketchum

(57) ABSTRACT

For interference control, a sector m estimates interference observed from terminals in neighbor sectors and obtains an interference estimate. Sector m may generate an over-the-air (OTA) other-sector interference (OSI) report and/or an intersector (IS) OSI report based on the interference estimate. Sector m may broadcast the OTA OSI report to the terminals in the neighbor sectors. These terminals may adjust their transmit powers based on the OTA OSI report. Sector m may send the IS OSI report to the neighbor sectors, receive IS OSI reports from the neighbor sectors, and regulate data transmissions for terminals in sector m based on the received IS OSI reports. Sector m may control admission of terminals to sector m, de-assign admitted terminals, schedule terminals in sector m in a manner to reduce interference to the neighbor sectors, and/or assign the terminals in sector m with traffic channels that cause less interference to the neighbor sectors.

24 Claims, 7 Drawing Sheets

(51) Int. Cl.
  *H04W 52/24* (2009.01)
  *H04W 72/08* (2009.01)
  *H04L 1/00* (2006.01)
  *H04W 28/24* (2009.01)
  *H04W 52/26* (2009.01)
  *H04B 17/00* (2006.01)
  *H04W 92/20* (2009.01)
  *H04W 52/14* (2009.01)
  *H04W 52/36* (2009.01)

(56) References Cited

U.S. PATENT DOCUMENTS

| | | |
|---|---|---|
| 4,539,684 A | 9/1985 | Kloker |
| 4,638,479 A | 1/1987 | Alexis |
| 4,901,307 A | 2/1990 | Gilhousen et al. |
| 4,908,827 A | 3/1990 | Gates |
| 5,103,459 A | 4/1992 | Gilhousen et al. |
| 5,267,262 A | 11/1993 | Wheatley, III |
| 5,301,364 A | 4/1994 | Arens et al. |
| 5,396,516 A | 3/1995 | Padovani et al. |
| 5,406,613 A | 4/1995 | Peponides et al. |
| 5,448,600 A | 9/1995 | Lucas |
| 5,469,471 A | 11/1995 | Wheatley, III |
| 5,548,812 A | 8/1996 | Padovani et al. |
| 5,559,790 A | 9/1996 | Yano et al. |
| 5,574,984 A | 11/1996 | Reed et al. |
| 5,606,727 A * | 2/1997 | Ueda ............................. 455/513 |
| 5,722,063 A | 2/1998 | Peterzell et al. |
| 5,734,646 A | 3/1998 | I et al. |
| 5,754,533 A | 5/1998 | Bender et al. |
| 5,774,785 A | 6/1998 | Karlsson |
| 5,784,363 A | 7/1998 | Engstrom et al. |
| 5,815,507 A | 9/1998 | Vinggaard et al. |
| 5,839,056 A | 11/1998 | Hakkinen |
| 5,859,383 A | 1/1999 | Davison et al. |
| 5,933,768 A | 8/1999 | Skold et al. |
| 5,956,642 A | 9/1999 | Larsson et al. |
| 5,961,588 A | 10/1999 | Cooper et al. |
| 5,995,488 A | 11/1999 | Kalkunte et al. |
| 5,996,103 A | 11/1999 | Jahanghir |
| 5,996,110 A | 11/1999 | Kosmach |
| 6,006,073 A | 12/1999 | Glauner et al. |
| 6,012,160 A | 1/2000 | Dent |
| 6,038,220 A | 3/2000 | Kang et al. |
| 6,044,072 A | 3/2000 | Ueda |
| 6,047,189 A | 4/2000 | Yun et al. |
| 6,061,339 A | 5/2000 | Nieczyporowicz et al. |
| 6,075,974 A | 6/2000 | Saints et al. |
| 6,101,179 A | 8/2000 | Soliman |
| 6,112,325 A | 8/2000 | Burshtein |
| 6,144,841 A | 11/2000 | Feeney |
| 6,154,659 A | 11/2000 | Jalali et al. |
| 6,173,162 B1 | 1/2001 | Dahlman et al. |
| 6,173,187 B1 | 1/2001 | Salonaho et al. |
| 6,173,188 B1 | 1/2001 | Kim |
| 6,175,587 B1 | 1/2001 | Madhow et al. |
| 6,175,588 B1 | 1/2001 | Visotsky et al. |
| 6,181,738 B1 | 1/2001 | Chheda et al. |
| 6,188,678 B1 | 2/2001 | Prescott |
| 6,192,249 B1 | 2/2001 | Padovani |
| 6,208,699 B1 | 3/2001 | Chen et al. |
| 6,212,364 B1 | 4/2001 | Park |
| 6,216,006 B1 | 4/2001 | Scholefield et al. |
| 6,226,529 B1 | 5/2001 | Bruno et al. |
| 6,233,222 B1 | 5/2001 | Wallentin |
| 6,397,070 B1 | 5/2002 | Black |
| 6,405,043 B1 | 6/2002 | Jensen et al. |
| 6,446,236 B1 | 9/2002 | McEwen et al. |
| 6,449,463 B1 | 9/2002 | Schiff |
| 6,519,705 B1 | 2/2003 | Leung |
| 6,532,563 B2 | 3/2003 | Nobelen |
| 6,539,065 B1 | 3/2003 | Furukawa |
| 6,553,231 B1 | 4/2003 | Karlsson et al. |
| 6,560,744 B1 | 5/2003 | Burshtein |
| 6,560,774 B1 | 5/2003 | Gordon et al. |
| 6,574,211 B2 | 6/2003 | Padovani et al. |
| 6,597,705 B1 | 7/2003 | Rezaiifar et al. |
| 6,597,923 B1 | 7/2003 | Vanghi et al. |
| 6,597,932 B2 | 7/2003 | Tian et al. |
| 6,603,746 B1 | 8/2003 | Larijani et al. |
| 6,609,008 B1 | 8/2003 | Whang et al. |
| 6,611,507 B1 | 8/2003 | Hottinen et al. |
| 6,621,454 B1 | 9/2003 | Reudink et al. |
| 6,628,956 B2 | 9/2003 | Bark et al. |
| 6,643,520 B1 | 11/2003 | Park et al. |
| 6,697,634 B1 | 2/2004 | Hayashi |
| 6,711,150 B1 | 3/2004 | Vanghi |
| 6,711,515 B1 | 3/2004 | Lehtinen et al. |
| 6,717,976 B1 | 4/2004 | Shen |
| 6,721,373 B1 | 4/2004 | Frenkel et al. |
| 6,744,743 B2 | 6/2004 | Walton et al. |
| 6,745,045 B2 | 6/2004 | Terry et al. |
| 6,751,444 B1 | 6/2004 | Meiyappan |
| 6,763,244 B2 | 7/2004 | Chen et al. |
| 6,801,515 B1 | 10/2004 | Ishikawa et al. |
| 6,801,759 B1 | 10/2004 | Saifuddin |
| 6,807,164 B1 | 10/2004 | Almgren et al. |
| 6,895,245 B2 | 5/2005 | Wallentin |
| 6,950,669 B2 | 9/2005 | Simonsson |
| 6,952,591 B2 | 10/2005 | Budka et al. |
| 6,968,201 B1 | 11/2005 | Gandhi et al. |
| 6,977,912 B1 | 12/2005 | Porter et al. |
| 6,983,153 B2 | 1/2006 | Jain et al. |
| 7,012,912 B2 | 3/2006 | Naguib et al. |
| 7,054,275 B2 | 5/2006 | Kim et al. |
| 7,058,421 B2 | 6/2006 | Ngai et al. |
| 7,062,288 B2 | 6/2006 | Raaf et al. |
| 7,072,315 B1 | 7/2006 | Liu et al. |
| 7,072,663 B2 | 7/2006 | Ramos et al. |
| 7,103,316 B1 | 9/2006 | Hall |
| 7,145,935 B2 | 12/2006 | Won et al. |
| 7,158,450 B2 | 1/2007 | Wada et al. |
| 7,158,504 B2 | 1/2007 | Kadaba et al. |
| 7,181,170 B2 | 2/2007 | Love et al. |
| 7,184,381 B2 | 2/2007 | Ohkubo et al. |
| 7,197,692 B2 | 3/2007 | Sutivong et al. |
| 7,215,653 B2 | 5/2007 | Kim et al. |
| 7,224,993 B2 | 5/2007 | Meyers et al. |
| 7,254,158 B2 | 8/2007 | Agrawal |
| 7,269,152 B2 * | 9/2007 | Vukovic et al. ............... 370/332 |
| 7,302,276 B2 | 11/2007 | Bernhardsson et al. |
| 7,310,526 B2 | 12/2007 | Sang et al. |
| 7,324,785 B2 | 1/2008 | Hansen et al. |
| 7,349,667 B2 | 3/2008 | Magee et al. |
| 7,359,727 B2 | 4/2008 | Tsien et al. |
| 7,359,838 B2 | 4/2008 | Marro et al. |
| 7,363,039 B2 | 4/2008 | Laroia et al. |
| 7,400,887 B2 | 7/2008 | Azman et al. |
| 7,418,241 B2 | 8/2008 | Bao et al. |
| 7,420,939 B2 | 9/2008 | Laroia et al. |
| 7,477,920 B2 | 1/2009 | Scheinert et al. |
| 7,512,412 B2 | 3/2009 | Mese et al. |
| 7,536,626 B2 | 5/2009 | Sutivong et al. |
| 7,551,637 B2 | 6/2009 | Damnjanovic et al. |
| 7,594,151 B2 | 9/2009 | Sutivong et al. |
| 7,630,321 B2 | 12/2009 | Jain et al. |
| 7,639,943 B1 | 12/2009 | Kalajan |
| 7,808,895 B2 | 10/2010 | Nalawadi et al. |
| 7,962,826 B2 | 6/2011 | Sutivong et al. |
| 7,965,789 B2 | 6/2011 | Khandekar et al. |
| 8,095,166 B2 | 1/2012 | Sampath et al. |
| 8,116,800 B2 | 2/2012 | Gorokhov et al. |
| 8,150,448 B2 | 4/2012 | Farnsworth et al. |
| 8,159,928 B2 * | 4/2012 | Gorokhov et al. ............ 370/203 |
| 8,204,530 B2 | 6/2012 | Gorokhov et al. |
| 8,442,572 B2 | 5/2013 | Borran et al. |
| 8,452,316 B2 | 5/2013 | Sutivong et al. |
| 8,478,202 B2 | 7/2013 | Sutivong et al. |
| 8,488,487 B2 | 7/2013 | Borran et al. |
| 2001/0040880 A1 | 11/2001 | Chen et al. |
| 2001/0053695 A1 * | 12/2001 | Wallentin ..................... 455/436 |
| 2001/0055968 A1 | 12/2001 | Yoshida et al. |
| 2002/0018446 A1 | 2/2002 | Huh et al. |

(56) References Cited

U.S. PATENT DOCUMENTS

| | | | |
|---|---|---|---|
| 2002/0077138 A1* | 6/2002 | Bark et al. .................. 455/522 |
| 2002/0077985 A1 | 6/2002 | Kobata et al. |
| 2002/0102984 A1 | 8/2002 | Furuskar et al. |
| 2002/0102985 A1 | 8/2002 | Amalfitano et al. |
| 2002/0145968 A1 | 10/2002 | Zhang et al. |
| 2002/0167907 A1 | 11/2002 | Sarkar et al. |
| 2002/0187801 A1 | 12/2002 | Vanghi |
| 2002/0196766 A1 | 12/2002 | Hwang et al. |
| 2003/0012425 A1 | 1/2003 | Suzuki et al. |
| 2003/0013451 A1 | 1/2003 | Walton |
| 2003/0016770 A1 | 1/2003 | Trans et al. |
| 2003/0069014 A1 | 4/2003 | Raffel et al. |
| 2003/0081538 A1 | 5/2003 | Walton et al. |
| 2003/0086371 A1 | 5/2003 | Walton et al. |
| 2003/0128705 A1 | 7/2003 | Yi et al. |
| 2003/0185159 A1 | 10/2003 | Seo et al. |
| 2003/0185285 A1 | 10/2003 | Talwar |
| 2004/0038699 A1 | 2/2004 | Toono |
| 2004/0062192 A1 | 4/2004 | Liu et al. |
| 2004/0077370 A1 | 4/2004 | Dick et al. |
| 2004/0081121 A1 | 4/2004 | Xu |
| 2004/0095880 A1 | 5/2004 | Laroia et al. |
| 2004/0109432 A1 | 6/2004 | Laroia et al. |
| 2004/0151109 A1 | 8/2004 | Batra et al. |
| 2004/0166886 A1 | 8/2004 | Laroia et al. |
| 2004/0166887 A1 | 8/2004 | Laroia et al. |
| 2004/0166900 A1 | 8/2004 | Qiu et al. |
| 2004/0185868 A1 | 9/2004 | Jain et al. |
| 2004/0218567 A1 | 11/2004 | Budka et al. |
| 2005/0002324 A1 | 1/2005 | Sutivong et al. |
| 2005/0013283 A1 | 1/2005 | Yoon et al. |
| 2005/0026624 A1 | 2/2005 | Gandhi et al. |
| 2005/0037796 A1 | 2/2005 | Tsai et al. |
| 2005/0096061 A1 | 5/2005 | Ji et al. |
| 2005/0113106 A1 | 5/2005 | Duan et al. |
| 2005/0135457 A1 | 6/2005 | Molisch et al. |
| 2005/0147063 A1 | 7/2005 | Pi et al. |
| 2005/0153690 A1 | 7/2005 | Marinier et al. |
| 2005/0176455 A1 | 8/2005 | Krishnan et al. |
| 2005/0192042 A1 | 9/2005 | Au et al. |
| 2005/0276248 A1 | 12/2005 | Butala et al. |
| 2006/0009226 A1 | 1/2006 | Vicharelli et al. |
| 2006/0019496 A1 | 1/2006 | Onishi et al. |
| 2006/0019694 A1 | 1/2006 | Sutivong et al. |
| 2006/0025158 A1 | 2/2006 | Leblanc et al. |
| 2006/0034173 A1 | 2/2006 | Teague et al. |
| 2006/0083161 A1 | 4/2006 | Laroia et al. |
| 2006/0089154 A1 | 4/2006 | Laroia et al. |
| 2006/0105796 A1 | 5/2006 | Malladi et al. |
| 2006/0135080 A1 | 6/2006 | Khandekar et al. |
| 2006/0135169 A1 | 6/2006 | Sampath et al. |
| 2006/0141933 A1 | 6/2006 | Smee et al. |
| 2006/0164993 A1 | 7/2006 | Teague et al. |
| 2006/0165650 A1 | 7/2006 | Pavone et al. |
| 2006/0171326 A1 | 8/2006 | Durand et al. |
| 2006/0187885 A1 | 8/2006 | Roy et al. |
| 2006/0189344 A1 | 8/2006 | Umesh et al. |
| 2006/0209721 A1 | 9/2006 | Mese et al. |
| 2006/0234752 A1 | 10/2006 | Mese et al. |
| 2006/0262868 A1 | 11/2006 | Leshem |
| 2006/0285503 A1 | 12/2006 | Mese et al. |
| 2007/0019589 A1 | 1/2007 | Attar et al. |
| 2007/0030827 A1 | 2/2007 | Rui et al. |
| 2007/0081491 A1 | 4/2007 | Kim et al. |
| 2007/0150799 A1 | 6/2007 | Sutivong et al. |
| 2007/0161385 A1 | 7/2007 | Anderson |
| 2007/0249363 A1 | 10/2007 | Amalfitano et al. |
| 2007/0258525 A1 | 11/2007 | Jacobsen et al. |
| 2007/0270100 A1 | 11/2007 | Agrawal et al. |
| 2007/0274257 A1 | 11/2007 | Bae et al. |
| 2007/0280170 A1 | 12/2007 | Kawasaki |
| 2007/0286105 A1 | 12/2007 | Kim et al. |
| 2007/0286128 A1 | 12/2007 | Bae et al. |
| 2008/0014980 A1 | 1/2008 | Yano et al. |
| 2008/0031380 A1 | 2/2008 | Takabayashi |
| 2008/0037439 A1 | 2/2008 | Cave et al. |
| 2008/0039129 A1 | 2/2008 | Li et al. |
| 2008/0043880 A1 | 2/2008 | Matsushita |
| 2008/0045260 A1 | 2/2008 | Muharemovic et al. |
| 2008/0056181 A1 | 3/2008 | Imamura et al. |
| 2008/0062956 A1 | 3/2008 | Kuroda et al. |
| 2008/0117833 A1 | 5/2008 | Borran et al. |
| 2008/0117849 A1 | 5/2008 | Borran et al. |
| 2008/0161033 A1 | 7/2008 | Borran et al. |
| 2008/0165675 A1 | 7/2008 | Yang et al. |
| 2008/0166976 A1 | 7/2008 | Rao |
| 2008/0214121 A1 | 9/2008 | Sutivong et al. |
| 2008/0267067 A1 | 10/2008 | Salazar et al. |
| 2008/0291856 A1 | 11/2008 | Li et al. |
| 2009/0023466 A1 | 1/2009 | Sutivong et al. |
| 2009/0082052 A1 | 3/2009 | Bhushan et al. |
| 2009/0109939 A1 | 4/2009 | Bhushan et al. |
| 2009/0117931 A1 | 5/2009 | Shin et al. |
| 2009/0147693 A1 | 6/2009 | Teague et al. |
| 2009/0149140 A1 | 6/2009 | Borran et al. |
| 2010/0027451 A1 | 2/2010 | Khandekar et al. |
| 2010/0061243 A1 | 3/2010 | Yi et al. |
| 2011/0105111 A1 | 5/2011 | Plestid et al. |
| 2011/0223957 A1 | 9/2011 | Pietraski |
| 2011/0282999 A1 | 11/2011 | Teague et al. |
| 2011/0296279 A1 | 12/2011 | Sutivong et al. |
| 2012/0083302 A1 | 4/2012 | Borran et al. |
| 2013/0107740 A1 | 5/2013 | Mese et al. |
| 2013/0237262 A1 | 9/2013 | Borran et al. |

FOREIGN PATENT DOCUMENTS

| | | |
|---|---|---|
| CL | 199500144 | 12/1995 |
| CL | 184195 | 7/1996 |
| CL | 199701119 | 3/1998 |
| CL | 199800442 | 11/1998 |
| CN | 1190848 | 8/1998 |
| CN | 1250342 | 4/2000 |
| CN | 1292981 A | 4/2001 |
| EP | 0668662 A1 | 8/1995 |
| EP | 0673125 A1 | 9/1995 |
| EP | 0715423 | 6/1996 |
| EP | 0767548 | 4/1997 |
| EP | 0889663 A1 | 1/1999 |
| EP | 0955736 A2 | 11/1999 |
| EP | 1175056 A1 | 1/2002 |
| EP | 1315310 A2 | 5/2003 |
| EP | 1320276 A2 | 6/2003 |
| EP | 1515475 A1 | 3/2005 |
| GB | 2378858 | 2/2003 |
| JP | H1032605 A | 2/1998 |
| JP | 2000040999 A | 2/2000 |
| JP | 2000504529 | 4/2000 |
| JP | 2001044926 | 2/2001 |
| JP | 2001274748 | 10/2001 |
| JP | 2001285193 | 10/2001 |
| JP | 2001518767 A | 10/2001 |
| JP | 2001519618 | 10/2001 |
| JP | 2001358649 A | 12/2001 |
| JP | 2002026747 A | 1/2002 |
| JP | 2002501353 A | 1/2002 |
| JP | 2002506334 A | 2/2002 |
| JP | 2002077985 A | 3/2002 |
| JP | 2003032218 | 1/2003 |
| JP | 2003510950 A | 3/2003 |
| JP | 2003318818 A | 11/2003 |
| JP | 2004503126 A | 1/2004 |
| JP | 2004064142 A | 2/2004 |
| JP | 2004080340 A | 3/2004 |
| JP | 2004104293 | 4/2004 |
| JP | 2004214914 A | 7/2004 |
| JP | 2004253899 A | 9/2004 |
| JP | 2004260467 A | 9/2004 |
| JP | 2005501444 A | 1/2005 |
| JP | 2005502218 A | 1/2005 |
| JP | 2005065182 A | 3/2005 |
| JP | 2005348433 A | 12/2005 |
| JP | 2006141038 A | 6/2006 |
| JP | 2006222560 A | 8/2006 |

(56) References Cited

FOREIGN PATENT DOCUMENTS

| | | |
|---|---|---|
| JP | 2007518361 A | 7/2007 |
| JP | 2010200474 | 9/2010 |
| KR | 100262027 B1 | 7/2000 |
| KR | 200228664 | 4/2002 |
| KR | 20030004985 A | 1/2003 |
| KR | 20030024442 | 3/2003 |
| KR | 200427165 | 4/2004 |
| KR | 20040088982 A | 10/2004 |
| RU | 2001531 C1 | 10/1993 |
| RU | 2120183 C1 | 10/1998 |
| RU | 2163053 C2 | 2/2001 |
| RU | 2198465 C2 | 2/2003 |
| RU | 2214690 C2 | 2/2003 |
| RU | 2214680 C2 | 10/2003 |
| RU | 2360364 C2 | 6/2006 |
| TW | 462155 B | 11/2001 |
| TW | 508910 B | 11/2002 |
| TW | 546927 B | 8/2003 |
| WO | 9427381 A1 | 11/1994 |
| WO | 9824198 | 6/1998 |
| WO | 9830057 A1 | 7/1998 |
| WO | 9918689 | 4/1999 |
| WO | WO-9917576 A1 | 4/1999 |
| WO | 9935865 A1 | 7/1999 |
| WO | 9945736 A1 | 9/1999 |
| WO | 0055976 A2 | 9/2000 |
| WO | 0120808 A2 | 3/2001 |
| WO | 0124402 | 4/2001 |
| WO | 0178291 A2 | 10/2001 |
| WO | 0182504 | 11/2001 |
| WO | 0249305 A2 | 6/2002 |
| WO | WO-02052757 A1 | 7/2002 |
| WO | WO-03049396 A2 | 6/2003 |
| WO | 03085878 A1 | 10/2003 |
| WO | 2004032548 A1 | 4/2004 |
| WO | 2004042954 A1 | 5/2004 |
| WO | 2004059874 | 7/2004 |
| WO | WO-2004077871 A1 | 9/2004 |
| WO | 2005034545 A1 | 4/2005 |
| WO | WO-2005069519 | 7/2005 |
| WO | WO-2005071868 A1 | 8/2005 |

OTHER PUBLICATIONS

C30-20060327-023, "Qualcomm Proposal for 3GPP2 Air Interface Evolution Phase 2", Dallas, TX, Mar. 2006.

Damnjanovic, A.D. et al., "IS-2000 Enhanced Closed Loop Power Control for Turbo Coding," IEEE 54th Vehicular Technology Proceedings, Oct. 7-11, 2001, pp. 2314-2318, XP-010562383.

Elmusrati, et al., "Multi-Objective Distributed Power Control Algorithm," Vehicular Technology Conference Proceedings VTC 2002 Fall IEEE 56th, vol. 2, pp. 812-816.

European Search Report-EP10010371, Search Authority-Munich Patent Office, Nov. 2, 2010.

Hosein, "Interference Management of OFDMA Uplinks," IEEE 65th Vehicular Technology Conference, VTC2007-Spring, pp. 2435-2439, Apr. 22-25, 2007.

International Search Report PCT/US2006/009550,International SearchAuthority European Patent Office.

Nevdyaev, L.M., Telecommunication Technologies, Moscow, Svyaz' I Biznes, 2002, p. 209.

Padovani R., "The Application of Spread Spectrum to PCS has Become a Reality Reverse Link Performance of IS-95 Based Cellular Systems," IEEE Personal Communication, US, IEEE Communications Society, vol. 1, No. 3, Jul. 1, 1994, pp. 28-34.

Qualcomm Incorporated: QFDD Technology Overview Presentation, IEEE 802.20 Working Group on Mobile Broadband Wireless Access, C802.20-05-59, Nov. 2005, XP002518168, Retrieved from Internet: URL:http://grouper.ieee.org/groups/802/20/Contributions.html, pp. 45-47, Oct. 28, 2005.

Shao, L et al., "Downlink multicell MIMO-OFDM: An architecture for next generation wireless networks," in Proc. IEEE Wireless Commun. and Networking Conf. (WCNC), vol. 2, Santa Clara, USA, Mar. 2005, pp. 1120-1125.

Taiwan Search Report-TW095108821-TIPO-Jan. 5, 2012.

Tanaka, M et al., Fast initial acquisition of transmitter power for the reverse link DS/CDMA cellular systems, May 1998, IEEE Vehicular Technology Conference, p. 2436-2440.

Telecommunications Industry Association, Mobile Station-Base Station Compatibility Standard for Dual-Mode Wideband Spread Spectrum Cellular System, TIA/EIA-95, Jul. 1993, 668 pages.

Tomcik J., "QFDD and QTDD:Technology Overview", IEEE 802.20 Working Group on Mobile Broadband Wireless Access, XP002480491, Oct. 28, 2005, pp. 1, 61-106, Retrieved from Internet: URL: http://grouper.iee.org/groups/802/20/Contributions.html.

Tomcik T., "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).

U.S. Appl. No. 60/516,557, "Layered Frequency Hopping for OFDMA", filed on Oct. 30, 2003 by Ji. et al., 6 pages.

Written Opinion PCT/US2006/009550, International Search Authority European Patent Office.

China Unicom et al., "Joint Proposal for 3GPP2 Physical Layer for FDD Spectra", C30-20060731-040R4_HKLLMNQRSUZ_PP2Phase2_FDD_Proposal -1,3GPP2,Jul. 31, 2006.

Qualcomm Incorporated: "Qualcomm Proposal for 3GPP2 Physical Layer", C30-20060522-035 QC_Proposal_v1.0, 3GPP2, May 22, 2006.

Qualcomm Incorporated: "Qualcomm Proposal for 3GPP2 Physical Layer for FDD Spectra", C30-20060626-028_QCOM_UHDR-One_FDD_Proposal_v1.0, 3GPP2, Jun. 26, 2006.

Tomcik, J., "QFDD and QTDD: Technology Overview", IEEE 802.20 Working Group on Mobile Broadband Wireless Access, Oct. 28, 2005, pp. 48-50, URL: http://www.ieee802.org/20/contribs/C802.20-05-68.zip.

Tomcik J., "QTDD Technology Overview Presentation", IEEE C802.20-05-64r1, Nov. 15, 2005.

Siemens, "Power Control for E-UTRA Random Access and TP," 3GPP TSG-RAN WG1 #44bis, 3GPP, Mar. 31, 2006, Tdoc R1-061041.

* cited by examiner

INTERFERENCE CONTROL IN A WIRELESS COMMUNICATION SYSTEM

CROSS-REFERENCE TO RELATED APPLICATION

This application is a continuation of U.S. patent application Ser. No. 11/158,584 filed Jun. 21, 2005, which claims priority to U.S. Provisional Patent Application Ser. No. 60/662,176, filed Mar. 15, 2005. The aforementioned applications are incorporated herein by reference in their entirety.

BACKGROUND

I. Field

The present disclosure relates generally to communication, and more specifically to interference control in a wireless communication system.

II. Background

A wireless multiple-access communication system can concurrently communicate with multiple terminals on the forward and reverse links. The forward link (or downlink) refers to the communication link from the base stations to the terminals, and the reverse link (or uplink) refers to the communication link from the terminals to the base stations. Multiple terminals may simultaneously transmit data on the reverse link and/or receive data on the forward link. This is often achieved by multiplexing the transmissions on each link to be orthogonal to one another in time, frequency and/or code domain.

On the reverse link, the transmissions from terminals communicating with different base stations are typically not orthogonal to one another. Consequently, each terminal may cause interference to other terminals communicating with nearby base stations and may also receive interference from these other terminals. The performance of each terminal is degraded by the interference from the other terminals communicating with other base stations.

There is therefore a need in the art for techniques to mitigate interference in a wireless communication system.

SUMMARY

Techniques for controlling interference observed by each sector from neighbor sectors in a wireless communication system are described herein. The term "sector" can refer to a base station or the coverage area of the base station. A sector m estimates interference observed from terminals in neighbor sectors and obtains an interference estimate. For user-based interference control, sector m generates an over-the-air (OTA) other-sector interference (OSI) report based on the interference estimate and broadcasts the OTA OSI report to the terminals in the neighbor sectors. These terminals may autonomously adjust their transmit powers based on the OTA OSI report from sector m, if necessary, to reduce the amount of interference observed by sector m. The OTA OSI report may indicate one of multiple possible levels of interference observed by sector m. The terminals in the neighbor sectors may adjust their transmit powers by different amounts and/or at different rates depending on the interference level observed by sector m.

For network-based interference control, sector m generates an inter-sector (IS) OSI report based on the interference estimate and sends the IS OSI report to the neighbor sectors. The IS OSI report may be the same as the OTA OSI report or may be more comprehensive. Sector m also receives IS OSI reports from the neighbor sectors and regulates data transmissions for the terminals in sector m based on the received IS OSI reports. Sector m may regulate data transmissions by (1) controlling admission of new terminals to sector m, (2) de-assigning terminals that have already been admitted, (3) scheduling the terminals in sector m in a manner to reduce interference to the neighbor sectors, and/or (4) assigning the terminals in sector m with traffic channels that cause less interference to the neighbor sectors.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
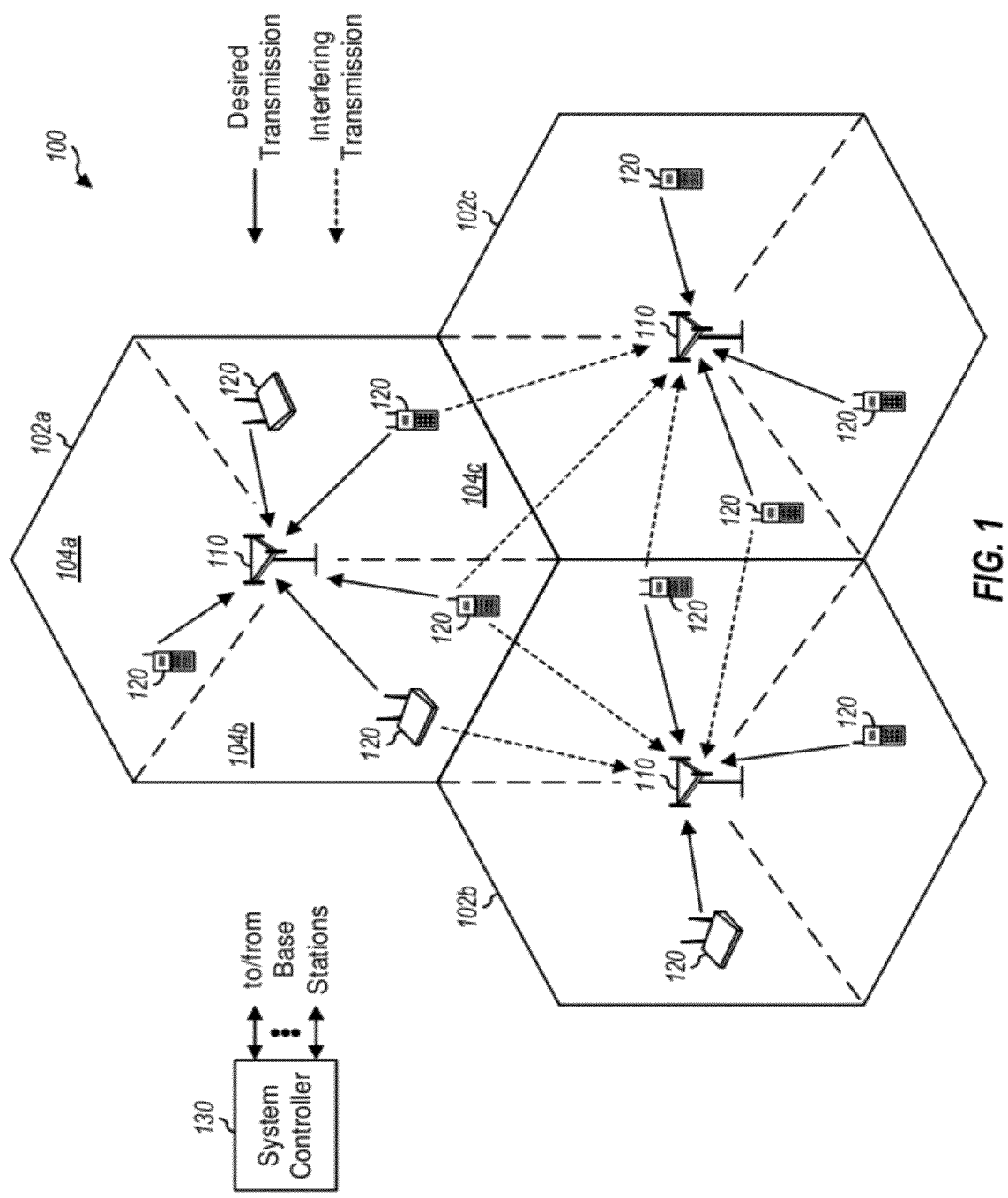
FIG. 1 shows a communication system with base stations and terminals.

FIG. 1 shows a wireless communication system 100 with multiple base stations 110 and multiple terminals 120. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, the base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. A system controller 130 couples to base stations 110 and provides coordination and control for these base stations.

A terminal may be fixed or mobile and may also be called a mobile station, a wireless device, a user equipment, or some other terminology. Each terminal may communicate with zero, one, or multiple base stations at any given moment.

The interference control techniques described herein may be used for a system with sectorized cells and a system with un-sectorized cells. In the following description, the term "sector" refers to (1) a conventional BTS and/or its coverage area for a system with sectorized cells and (2) a conventional base station and/or its coverage area for a system with unsectorized cells. The terms "terminal" and "user" are used interchangeably, and the terms "sector" and "base station" are also used interchangeably. A serving base station/sector is a base station/sector with which a terminal communicates. A neighbor base station/sector is a base station/sector with which the terminal is not in communication.

The interference control techniques may also be used for various multiple-access communication systems. For example, these techniques may be used for a code division multiple access (CDMA) system, a frequency division multiple access (FDMA) system, a time division multiple access (TDMA) system, an orthogonal frequency division multiple access (OFDMA) system, an interleaved (IFDMA) system, a localized FDMA (LFDMA) system, a spatial division multiple access (SDMA) system, a quasi-orthogonal multiple-access system, and so on. IFDMA is also called distributed FDMA, and LFDMA is also called narrowband FDMA or classical FDMA. An OFDMA system utilizes orthogonal frequency division multiplexing (OFDM). OFDM, IFDMA, and LFDMA effectively partition the overall system bandwidth into multiple (K) orthogonal frequency subbands. These subbands are also called tones, subcarriers, bins, and so on. Each subband is associated with a respective subcarrier that may be modulated with data. OFDM transmits modulation symbols in the frequency domain on all or a subset of the K subbands. IFDMA transmits modulation symbols in the time domain on subbands that are uniformly distributed across the K subbands. LFDMA transmits modulation symbols in the time domain and typically on adjacent subbands.

As shown in FIG. 1 each sector may receive "desired" transmissions from terminals within the sector as well as "interfering" transmissions from terminals in other sectors. The total interference observed at each sector is composed of (1) intra-sector interference from terminals within the same sector and (2) inter-sector interference from terminals in other sectors. The inter-sector interference, which is also called other sector interference (OSI), results from the transmissions in each sector not being orthogonal to the transmissions in the other sectors. The inter-sector interference and intra-sector interference have a large impact on performance and may be mitigated as described below.

Inter-sector interference may be controlled using various mechanisms such as user-based interference control and network-based interference control. For user-based interference control, the terminals are informed of the inter-sector interference observed by the neighbor sectors and adjust their transmit powers accordingly so that the inter-sector interference is maintained within acceptable levels. For network-based interference control, each sector is informed of the inter-sector interference observed by the neighbor sectors and regulates data transmissions for its terminals such that the inter-sector interference is maintained within acceptable levels. The system may utilize only user-based interference control, or only network-based interference control, or both. Each interference control mechanism may be implemented in various manners, as described below.

Figure 2:
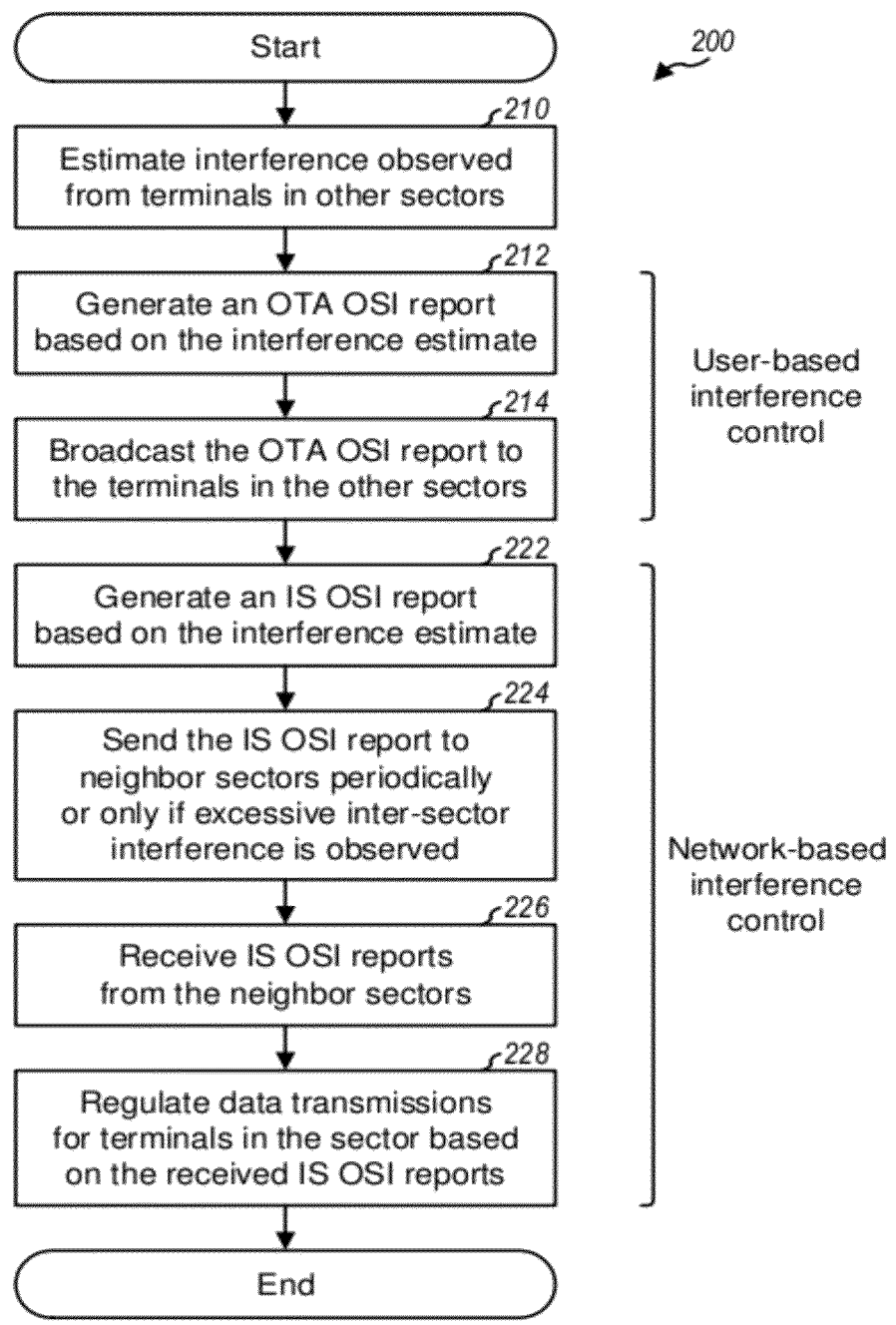
FIG. 2 shows a process performed by one sector for interference control.

FIG. 2 shows a process 200 performed by one sector m for inter-sector interference control. Sector m estimates interference observed from terminals in other sectors and obtains an interference estimate (block 210).

For user-based interference control, sector m generates an over-the-air (OTA) OSI report based on the interference estimate (block 212). The OTA OSI report conveys the amount of inter-sector interference observed by sector m and may be given in various forms, as described below. Sector m broadcasts the OTA OSI report to the terminals in the neighbor sectors (block 214). These terminals may adjust their transmit powers based on the OTA OSI report from sector m, if necessary, to reduce the amount of inter-sector interference observed by sector m.

For network-based interference control, sector m generates an inter-sector (IS) OSI report based on the interference estimate (block 222). The IS OSI report and the OTA OSI report are two interference reports that may have the same or different formats. For example, the IS OSI report may be the same as the OTA OSI report. Alternatively, sector m may broadcast a simple OTA OSI report to the terminals in the neighbor sectors and may send a more comprehensive IS OSI report to the neighbor sectors. Sector m may send the IS OSI report to the neighbor sectors periodically or only if sector m observes excessive interference (block 224). Sector m also receives IS OSI reports from the neighbor sectors (block 226). The rate at which the IS OSI reports are exchanged among the sectors may be the same or different from the rate at which the OTA OSI reports are broadcast to the terminals. Sector m regulates data transmissions for terminals in sector m based on the IS OSI reports received from the neighbor sectors (block 228). The blocks in FIG. 2 are described in further detail below.

Sector m may estimate the inter-sector interference in various manners. For a system utilizing orthogonal multiplexing, one terminal may transmit data or pilot on each subband in each symbol period. A pilot is a transmission of symbols that are known a priori by both a transmitter and a receiver. A data symbol is a modulation symbol for data, a pilot symbol is a modulation symbol for pilot, and a modulation symbol is a complex value for a point in a signal constellation, e.g., for M-PSK, M-QAM, and so on.

Sector m may estimate the interference on a given subband k in a given symbol period n based on a pilot received from a terminal u, as follows:

$$I_m(k,n)=|\hat{H}_{m,u}(k,n) \cdot P_u(k,n)-R_{m,u}(k,n)|^2, \quad \text{Eq (1)}$$

where $P_u(k,n)$ is a pilot symbol sent by terminal u on subband k in symbol period n;

$\hat{H}_{m,u}(k,n)$ is an estimate of the channel gain between sector m and terminal u;

$R_{m,u}(k,n)$ is a received symbol obtained by sector m from terminal u; and $I_m(k,n)$ is an estimate of the interference observed by sector m.

The quantities in equation (1) are scalars.

Sector m may also estimate the interference based on data received from terminal u, as follows:

$$I_m(k,n)=|\hat{H}_{m,u}(k,n) \cdot \hat{D}_{m,u}(k,n)-R_{m,u}(k,n)|^2, \quad \text{Eq (2)}$$

where $\hat{D}_{m,u}(k,n)$ is an estimate of a data symbol transmitted by terminal u on subband k in symbol period n. Sector m may derive data symbol estimates $\hat{D}_{m,u}(k,n)$ by (1) performing data detection on the received symbols $R_{m,u}(k,n)$ with the channel estimate $\hat{H}_{m,u}(k,n)$ to obtain detected symbols, (2) deriving hard-decisions based on the detected symbols, and (3) using the hard-decisions as the data symbol estimates. Alternatively, sector m may derive the data symbol estimates by (1) performing data detection on the received symbols, (2) decoding the detected symbols to obtain decoded data, and (3) re-encoding and symbol mapping the decoded data to obtain the data symbol estimates.

Sector m may also perform joint channel and interference estimation to obtain both channel response estimates and interference estimates.

The interference estimate $I_m(k,n)$ obtained from equation (1) or (2) includes both inter-sector interference and intra-sector interference. The intra-sector interference may be maintained within acceptable levels via power control, as described below, and may then be negligible in comparison to the inter-sector interference.

Sector m may average interference estimates across frequency, spatial, and/or time domains. For example, sector m may average the interference estimates across multiple receive antennas. Sector m may average the interference estimates for all subbands using any one of the following averaging schemes:

$$I_m(n) = \frac{1}{K} \sum_{k=1}^{K} I_m(k, n), \qquad \text{Eq (3)}$$

$$I_m(n) = \left( \prod_{k=1}^{K} I_m(k, n) \right)^{\frac{1}{K}}, \text{ and} \qquad \text{Eq (4)}$$

$$\log\left(1 + \frac{P_{nom}}{I_m(n)}\right) = \frac{1}{K} \cdot \sum_{k=1}^{K} \log\left(1 + \frac{P_{nom}}{I_m(k, n)}\right), \qquad \text{Eq (5)}$$

where $I_m(n)$ is the average interference power for sector m in symbol period n and $P_{mon}$ denotes a nominal received power for each subband. $I_m(k,n)$ and $I_m(n)$ are in linear units in equations (3) through (5). Equation (3) is for arithmetic averaging, equation (4) is for geometric averaging, and equation (5) is for SNR-based average. With arithmetic averaging, a few large interference estimates can skew the average interference power. Geometric averaging and SNR-based averaging can suppress large interference estimates for a few subbands.

Sector m may also filter the average interference power over multiple symbol periods to improve the quality of the interference estimate. The filtering may be achieved with a finite impulse response (FIR) filter, an infinite impulses response (IIR) filter, or some other type of filter. Sector m obtains a measured interference $I_{meas, m}$ for each measurement period, which may span one or multiple symbol periods.

Sector m generates an OTA OSI report based on the measured interference. In an embodiment, the measured interference is quantized to a predetermined number of bits, which are included in the OTA OSI report. In another embodiment, the OTA OSI report includes a single bit that indicates whether the measured interference is greater than or below an interference threshold. In yet another embodiment, the OTA OSI report includes multiple bits that convey the measured interference relative to multiple interference thresholds. For clarity, the following description is for an embodiment in which the OTA OSI report conveys the measured interference relative to two interference thresholds.

In an embodiment, the OTA OSI report includes two binary OSI bits, which are called OSI bit 1 and OSI bit 2. These OSI bits may be set as follows:

$$OSI \text{ bit1} = \begin{cases} \text{'1'}, & \text{if } I_{meas,m} \geq I_{nom\_th}, \\ \text{'0'}, & \text{if } I_{meas,m} < I_{nom\_th}, \end{cases} \qquad \text{Eq (6a)}$$

$$OSI \text{ bit2} = \begin{cases} \text{'1'}, & \text{if } I_{meas,m} \geq I_{high\_th}, \\ \text{'0'}, & \text{if } I_{meas,m} < I_{high\_th}, \end{cases} \qquad \text{Eq (6b)}$$

where $I_{nom\_th}$ is a nominal interference threshold, $I_{high\_th}$ is a high interference threshold, and $I_{high\_th} > I_{nom\_th}$. OSI bit 1 indicates whether the measured interference is above or below the nominal interference threshold. OSI bit 2 indicates whether the measured interference is above or below the high interference threshold. For this embodiment, sector m is deemed to observe low interference if the measured interference is below high interference if the measured interference is between $I_{nom\_th}$ and $I_{high\_th}$ and $I_{nom\_th}$, and excessive interference if the measured interference is greater than or equal to $I_{high\_th}$. OSI bit 2 may be used to indicate excessive interference being observed by the sector.

In another embodiment, the OTA OSI report includes a single OSI value having three levels. The OSI value may be set as follows:

$$OSI \text{ value} = \begin{cases} \text{'2'}, & \text{if } I_{meas,m} \geq I_{high\_th}, \\ \text{'1'}, & \text{if } I_{high\_th} > I_{meas,m} \geq I_{nom\_th}, \\ \text{'0'}, & \text{if } I_{meas,m} < I_{nom\_th}. \end{cases} \qquad \text{Eq (7)}$$

The tri-level OSI value may be transmitted using a signal constellation having three signal points. For example, an OSI value of '0' may be sent with a symbol of $1+j0$ or $e^{j0}$, an OSI value of '1' may be sent with a symbol of $0+j1$ or $e^{j\pi/2}$, and an OSI value of '2' may be sent with a symbol of $-1+j0$ or $e^{j\pi}$.

Alternatively, sector m may obtain a measured interference-over-thermal (IOT), which is a ratio of the total interference power observed by sector m to the thermal noise power. The total interference power may be computed as described above. The thermal noise power may be estimated by turning off the transmitter and measuring the noise at the receiver. A specific operating point may be selected for the system. A higher operating point allows the terminals to transmit at higher power levels on average. However, a high operating point has a negative impact on link budget and may be undesirable. For a given maximum transmit power and a given data rate, the tolerable maximum path loss decreases with increasing IOT. A very high operating point is also undesirable since the system can become interference limited, which is a situation whereby an increase in transmit power does not translate to an increase in received SNR. Furthermore, a very high operating point increases the likelihood of system instability. In any case, sector m may set its tri-level OSI value as follows:

$$OSI \text{ value} = \begin{cases} \text{'2'}, & \text{if } IOT_{meas,m} \geq IOT_{high\_th}, \\ \text{'1'}, & \text{if } IOT_{high\_th} > IOT_{meas,m} \geq IOT_{nom\_th}, \\ \text{'0'}, & \text{if } IOT_{meas,m} < IOT_{nom\_th}, \end{cases} \qquad \text{Eq (8)}$$

where $IOT_{nom\_th}$ is a nominal IOT threshold and $IOT_{high\_th}$ is a high IOT threshold.

The OSI bits/value may also be generated using hysteresis so that an indication of excessive interference does not toggle too frequently. For example, OSI bit 2 may be set to '1' only if the measured interference exceeds the high threshold for a first time duration $T_{W1}$ (e.g., 50 milliseconds) and may be reset to '0' only if the measured interference is below the high threshold for a second time duration $T_{w2}$. As another example, OSI bit 2 may be set to '1' only if the measured interference exceeds a first high threshold $I_{high\_th1}$ and may thereafter be reset to '0' only if the measured interference falls below a second high threshold $I_{high\_th2}$, where $I_{high\_th1} > I_{high\_th2}$.

Sector m broadcasts its OTA OSI report, which may contain the two OSI bits or the tri-level OSI value, for user-based interference control. Sector m may broadcast the OTA OSI report in various manners. In an embodiment, sector m broadcasts the OTA OSI report in each measurement period. In another embodiment, sector m broadcasts OSI bit 1 in each measurement period and broadcasts OSI bit 2 only if this bit is set to '1'. Sector m may also broadcast OSI reports from other sectors to the terminals within sector m for better OSI coverage.

Sector m also sends its IS OSI report to the neighbor sectors for network-based interference control. The IS OSI report may contain the two OSI bits, the tri-level OSI value, the measured interference quantized to a predetermined number of bits, or some other information. Sector m may send the IS OSI report in each measurement period, or only if excessive interference is observed, or if some other criterion is satisfied. Another sector q may also request sector m to send IS OSI report if the terminals in sector q indicate that they cannot receive the OSI bits from sector m. Each sector uses the IS OSI reports from the neighbor sectors to control data transmissions from the terminals in its sector to mitigate inter-sector interference at the neighbor sectors.

Network-based interference control may be achieved in various manners. Some embodiments of network-based interference control are described below.

In one embodiment, sector m schedules terminals in the sector based on the IS OSI reports received from the neighbor sectors. For example, if one or more neighbor sectors observe excessive interference, then sector m may reduce the transmit powers used by disadvantaged terminals in sector m so that these terminals cause less interference to other sectors. A disadvantaged terminal has a small channel gain (or a large path loss) for the serving sector and needs to transmit at a high power level in order to achieve a given signal-to-noise-and-interference ratio (SNR) at the serving sector. The disadvantaged terminal is typically located closer to a neighbor sector, and the high transmit power level results in high inter-sector interference to this neighbor sector.

Sector m may identify disadvantaged terminals based on various quality metrics such as channel gain, pilot strength, carrier-to-noise ratio (C/N), channel gain ratio, and so on. These quality metrics may be estimated based on pilot and/or other transmissions sent by the terminals. For example, the estimated channel gain for a terminal may be compared against a channel gain threshold, and the terminal may be deemed to be a disadvantaged terminal if its channel gain is below the channel gain threshold. Sector m may reduce the transmit powers used by the disadvantaged terminals by (1) lowering a high transmit power limit that is applicable to the terminals, (2) lowering a lower transmit power limit that is applicable to the terminals, (3) assigning the disadvantaged terminals with lower data rates that require lower SNRs and hence lower transmit powers, (4) not scheduling disadvantaged terminals for data transmission, or (5) using some other method or combination of methods.

In another embodiment, sector m uses admission control to mitigate inter-sector interference observed by neighbor sectors. For example, if one or more neighbor sectors observe excessive interference, then sector m may reduce the number of active terminals in the sector by (1) denying access to new terminals requesting to transmit on the reverse link, (2) denying access to disadvantaged terminals, (3) de-assigning terminals that have already been granted access, (4) de-assigning disadvantaged terminals, or (5) using some other admission control methods. The rate of de-assigning terminals may also be made a function of the IS OSI reports from the neighbor sectors (e.g., the observed interference levels), the number of neighbor sectors observing excessive interference, and/or other factors. Sector m may thus adjust the loading of the sector based on the IS OSI reports from the neighbor sectors.

In yet another embodiment, sector m assigns traffic channels to the terminals in the sector in a manner to mitigate inter-sector interference observed by the neighbor sectors. For example, each sector may be assigned a set of traffic channels that it may in turn assign to the terminals in the sector. Neighboring sectors may also share a common set of traffic channels that is orthogonal to the set of traffic channels assigned to each sector. If one or more neighbor sectors observe excessive interference, then sector m may assign disadvantaged terminals in sector m with traffic channels in the common set. These disadvantaged terminals would then cause no interference to the neighbor sectors since the traffic channels in the common set are orthogonal to the traffic channels assigned to the neighbor sectors. As another example, each sector may be assigned a set of traffic channels that it may assign to strong terminals that can tolerate high levels of interference. If one or more neighbor sectors observe excessive interference, then sector m may assign disadvantaged terminals in sector m with traffic channels assigned to strong terminals in the neighbor sectors.

For clarity, much of the description above is for one sector m. Each sector in the system may perform interference control as described above for sector m.

User-based interference control may also be achieved in various manners. In an embodiment, user-based interference control is achieved by allowing the terminals to autonomously adjust their transmit powers based on the OTA OSI reports received from the neighbor sectors.

Figure 3:
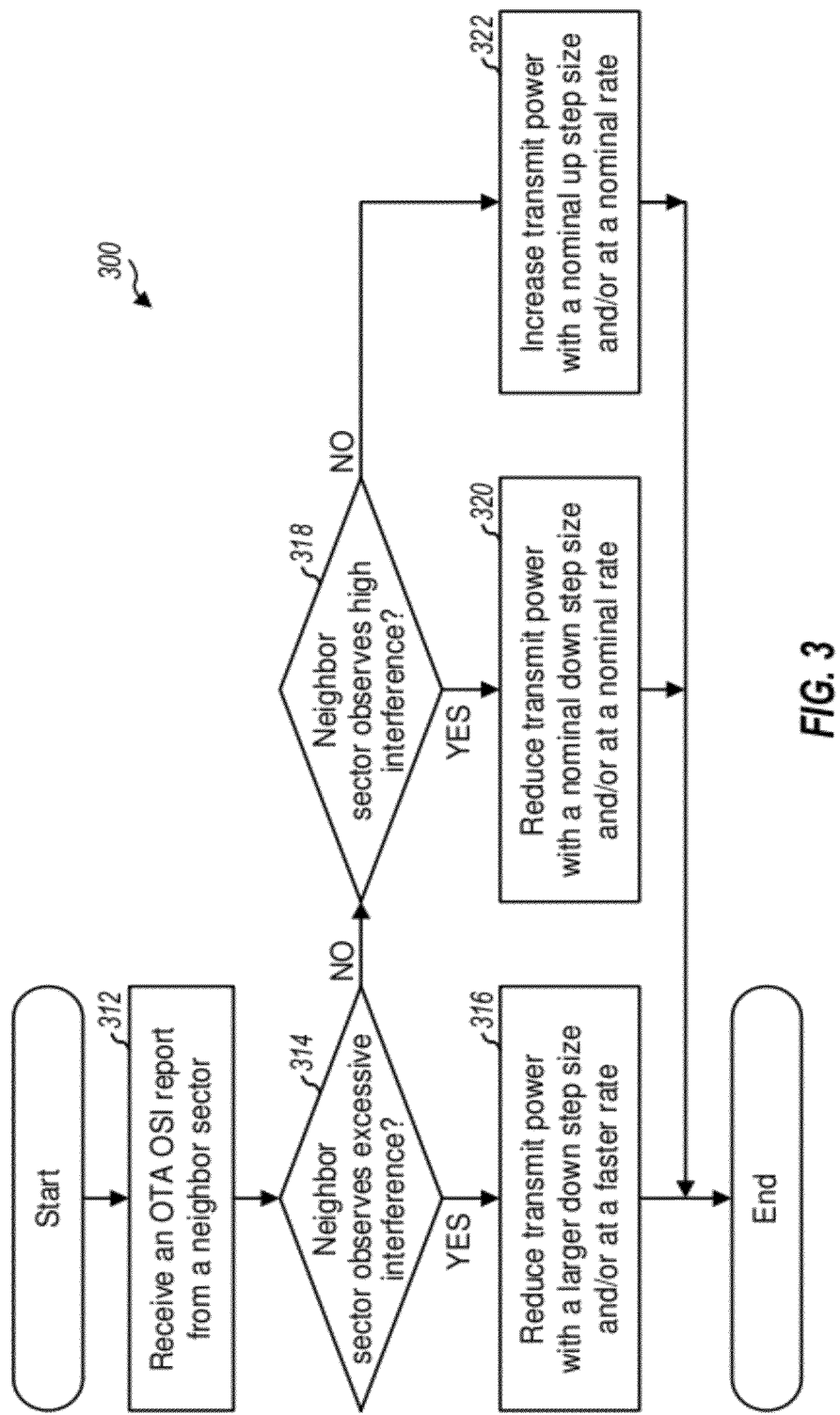
FIG. 3 shows a process performed by one terminal for interference control.

FIG. 3 shows a process 300 performed by one terminal u for interference control. Terminal u receives an OTA OSI report from a neighbor sector (block 312). A determination is then made whether the neighbor sector observes excessive interference, e.g., whether OSI bit 2 is set to '1' (block 314). If the answer is 'Yes', then terminal u reduces its transmit power with a larger down step size and/or at a faster rate (block 316). Otherwise, a determination is made whether the neighbor sector observes high interference, e.g., whether OSI bit 1 is set to '1' and OSI bit 2 is set to '0' (block 318). If the answer is 'Yes', then terminal u reduces its transmit power with a nominal down step size and/or at a nominal rate (block 320). Otherwise, terminal u increases its transmit power with a nominal up step size and/or at a nominal rate (block 322).

FIG. 3 shows an embodiment in which the OTA OSI report conveys the inter-sector interference observed by the neighbor sector in one of three possible levels—low, high, and excessive. Process 300 may be extended to cover any number of interference levels. In general, the transmit power for terminal u may be (1) reduced by a down step that is related to the amount of interference observed by the neighbor sector (e.g., larger down step for higher interference) when the measured interference is above a given threshold and/or (2) increased by an up step that is inversely related to the amount of interference observed by the neighbor sector (e.g., larger up step for lower interference) when the measured interference is below the given threshold. The step size and/or the adjustment rate may also be determined based on other parameters such as, for example, the current transmit power level for the terminal, the channel gain for the neighbor sector relative to the channel gain for the serving sector, prior OTA OSI reports, and so on.

Terminal u may adjust its transmit power based on the OTA OSI report from one or multiple neighbor sectors. Terminal u may estimate the channel gain for each sector based on a pilot received from the sector. Terminal u may then derive a channel gain ratio for each neighbor sector as follows:

$$r_i(n) = \frac{g_{ns,i}(n)}{g_{ss}(n)}, \quad \text{Eq (9)}$$

where $g_{ns,i}(n)$ is the channel gain between terminal u and neighbor sector i;

$g_{ss}(n)$ is the channel gain between terminal u and the serving sector; and $r_i(n)$ is the channel gain ratio for neighbor sector i.

In one embodiment, terminal u identifies the strongest neighbor sector with the largest channel gain ratio. Terminal u then adjusts its transmit power based on the OTA OSI report from only this strongest neighbor sector. In another embodiment, terminal u adjusts its transmit power based on the OTA OSI reports from all sectors in an OSI set. This OSI set may contain (1) T strongest neighbor sectors, where T≥1, (2) neighbor sectors with channel gain ratios exceeding a channel gain ratio threshold, (3) neighbor sectors with channel gains exceeding a channel gain threshold, (4) neighbor sectors included in a neighbor list broadcast by the serving sector, or (5) some other group of neighbor sectors. Terminal u may adjust its transmit power in various manners based on the OTA OSI reports from multiple neighbor sectors in the OSI set. For example, terminal u may decrease its transmit power if any neighbor sector in the OSI set observes high or excessive interference. As another example, terminal u may determine a transmit power adjustment for each neighbor sector in the OSI set and may then combine the adjustments for all neighbor sectors in the OSI set to obtain an overall transmit power adjustment.

In general, transmit power adjustment for interference control may be performed in conjunction with various power control schemes. For clarity, a specific power control scheme is described below. For this power control scheme, the transmit power for a traffic channel assigned to terminal u may be expressed as:

$$P_{dch}(n) = P_{ref}(n) + \Delta P(n), \quad \text{Eq (10)}$$

where $P_{dch}(n)$ is the transmit power for the traffic channel for update interval n;

$P_{ref}(n)$ is a reference power level for update interval n; and $\Delta P(n)$ is a transmit power delta for update interval n.

The transmit power levels $P_{dch}(n)$ and $P_{ref}(n)$ and the transmit power delta $\Delta P(n)$ are given in units of decibels (dB).

The reference power level $P_{ref}(n)$ is the amount of transmit power needed to achieve a target SNR for a designated transmission, which may be signaling sent by terminal u on a control channel or some other transmission. The reference power level and the target SNR may be adjusted to achieve a desired level of performance for the designated transmission, e.g., 1% packet error rate (PER). If the data transmission on the traffic channel and the designated transmission observe similar noise and interference characteristics, then the received SNR for the data transmission, $SNR_{dch}(n)$, may be estimated as:

$$SNR_{dch}(n) = SNR_{target} + \Delta P(n). \quad \text{Eq (11)}$$

The transmit power delta $\Delta P(n)$ may be adjusted in a deterministic manner, a probabilistic manner, or some other manner based on the OTA OSI reports from the neighbor sectors. The transmit power may be adjusted (1) by different amounts for different interference levels using deterministic adjustment or (2) at different rates for different interference levels using probabilistic adjustment. Exemplary deterministic and probabilistic transmit power adjustment schemes are described below. For simplicity, the following description is for transmit power adjustment for an OSI bit received from one neighbor sector. This OSI bit may be OSI bit 1 or 2.

Figure 4:
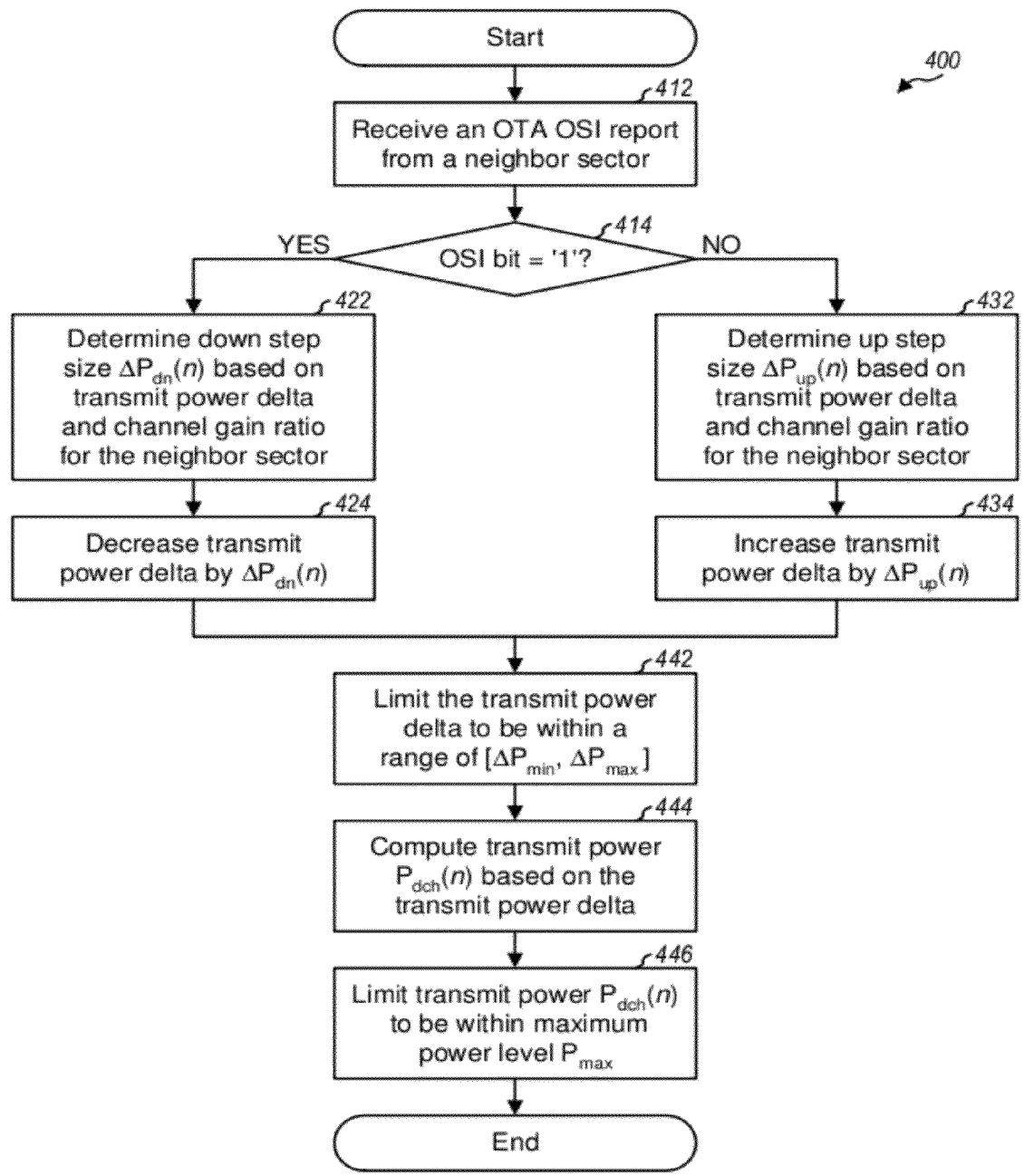
FIG. 4 shows a process for adjusting transmit power in a deterministic manner.

FIG. 4 shows a process 400 for adjusting the transmit power of terminal u in a deterministic manner. Initially, terminal u processes an OTA OSI report from a neighbor sector (block 412) and determines whether the OSI bit is '1' or '0' (block 414). If the OSI bit is '1', which indicates that the observed interference exceeds an interference threshold, then terminal u determines the amount of reduction in transmit power, or a down step size $\Delta P_{dn}(n)$ (block 422). $\Delta P_{dn}(n)$ may be determined based on the transmit power delta for the prior update interval, $\Delta P(n-1)$, and a channel gain ratio for the neighbor sector, $r_{ns}(n)$. Terminal u then decreases the transmit power delta by $\Delta P_{dn}(n)$ (block 424). Conversely, if the OSI bit is '0', then terminal u determines the amount of increase in transmit power, or an up step size $\Delta P_P(n)$ (block 432). $\Delta P_{up}(n)$ may also be determined based on $\Delta P(n-1)$ and $r_{ns}(n)$. Terminal u then increases the transmit power delta by $\Delta P_{up}(n)$ (block 434). The transmit power adjustments in blocks 424 and 434 may be expressed as:

$$\Delta P(n) = \begin{cases} \Delta P(n-1) + \Delta P_{up}(n), & \text{if } OSI \text{ bit} = \text{'0'}, \text{ and} \\ \Delta P(n-1) - \Delta P_{dn}(n), & \text{if } OSI \text{ bit} = \text{'1'}. \end{cases} \quad \text{Eq (12)}$$

After blocks 424 and 434, terminal u limits the transmit power delta $\Delta P(n)$ to be within a range of allowable transmit power deltas (block 442), as follows:

$$\Delta P(n) \in [\Delta P_{min}, \Delta P_{min}], \quad \text{Eq (13)}$$

where $\Delta P_{min}$ is the minimum transmit power delta allowable for the traffic channel, and $\Delta P_{max}$ is the maximum transmit power delta allowable for the traffic channel.

Constraining the transmit power deltas for all terminals in a sector to within a range of transmit power deltas, as shown in equation (13), can maintain the intra-sector interference within acceptable levels. The minimum transmit power delta $\Delta P_{min}$ may be adjusted by a control loop to ensure that each terminal can meet the requirements for a quality of service (QoS) class to which the terminal belongs. $\Delta P_{min}$ for different QoS classes may be adjusted at different rates and/or with different step sizes.

Terminal u then computes the transmit power $P_{dch}(n)$ for the traffic channel based on the transmit power delta $\Delta P(n)$ and the reference power level $P_{ref}(n)$, as shown in equation (10) (block 444). Terminal u may limit the transmit power $P_{dch}(n)$ to be within the maximum power level $P_{max}$ (block 446), as follows:

$$P_{dch}(n) = \begin{cases} P_{dch}(n), & \text{if } P_{dch}(n) \leq P_{max}, \\ P_{max}, & \text{otherwise.} \end{cases} \quad \text{Eq (14)}$$

Terminal u uses the transmit power $P_{dch}(n)$ for data transmission on the traffic channel.

In an embodiment, the $\Delta P_{dn}(n)$ and $\Delta P_{up}(n)$ step sizes are computed as:

$$\Delta P_{dn}(n) = f_{dn}(\Delta P_{dn,min}, \Delta P(n-1), r_{ns}(n), k_{dn}), \text{ and} \quad \text{Eq (15a)}$$

$$\Delta P_{up}(n) = f_{up}(\Delta P_{up,min}, \Delta P(n-1), r_{ns}(n), k_{up}), \quad \text{Eq (15b)}$$

where $\Delta P_{dn,min}$ and $\Delta P_{up,min}$ are minimum values for $\Delta P_{dn}(n)$ and $\Delta P_{up}(n)$, respectively;

$k_{dn}$ and $k_{up}$ are scaling factors for $\Delta P_{dn}(n)$ and $\Delta P_{up}(n)$, respectively; and $f_{dn}(\ )$ and $f_{up}(\ )$ are functions to compute $\Delta P_{dn}(n)$ and $\Delta P_{up}(n)$ respectively.

Function $f_{dn}(\ )$ may be defined such that $\Delta P_{dn}(n)$ is related to both $\Delta P(n-1)$ and $r_{ns}(n)$. If a neighbor sector observes high or excessive interference, then (1) a larger channel gain for the neighbor sector results in a larger $\Delta P_{dn}(n)$ and (2) a larger value of $\Delta P(n-1)$ results in a larger $\Delta P_{dn}(n)$. Function $f_{up}(\ )$ may be defined such that $\Delta P_{up}(n)$ is inversely related to both $\Delta P(n-1)$ and $r_{ns}(n)$. If the neighbor sector observes low interference, then (1) a larger channel gain for the neighbor sector results in a smaller $\Delta P_{up}(n)$ and (2) a larger value of $\Delta P(n-1)$ results in a smaller $\Delta P_{up}(n)$.

FIG. 4 shows the processing for one OSI bit from one neighbor sector. A larger value may be used for $\Delta P_{dn}(n)$ when the neighbor sector observes excessive interference. A smaller value may be used for $\Delta P_{dn}(n)$ when the neighbor sector observes high interference. Different down step sizes may be obtained, e.g., by using different scaling factors $k_{dn1}$ and $k_{dn2}$ for high and excessive interference, respectively.

Figure 5:
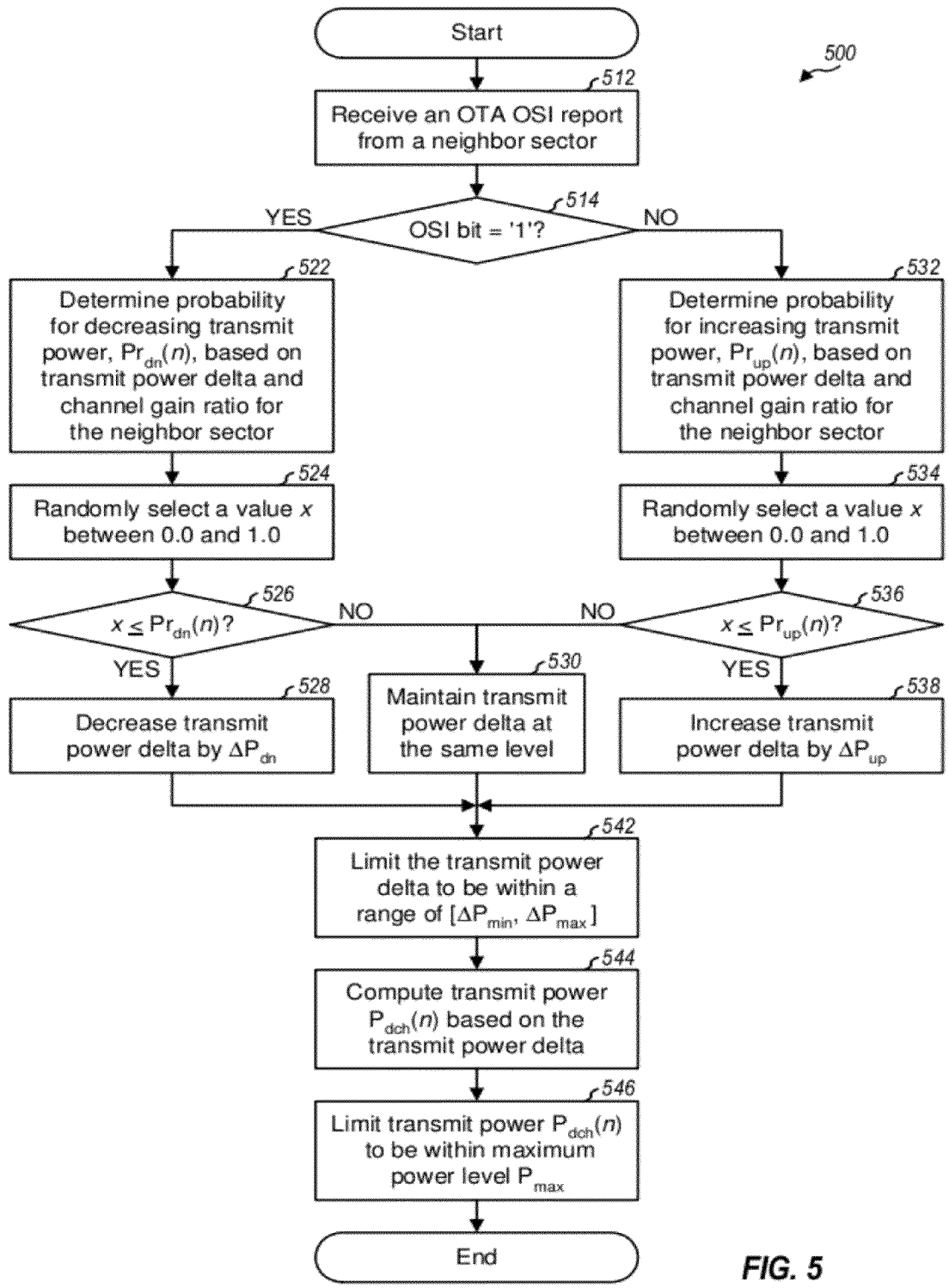
FIG. 5 shows a process for adjusting transmit power in a probabilistic manner.

FIG. 5 shows a process 500 for adjusting the transmit power of terminal u in a probabilistic manner. Initially, terminal u processes an OTA OSI report from a neighbor sector (block 512) and determines whether the OSI bit is '1' or '0' (block 514). If the OSI bit is '1', then terminal u determines the probability for decreasing the transmit power, $Pr_{dn}(n)$, e.g., based on $\Delta P(n-1)$ and $r_{ns}(n)$ (block 522). Terminal u then randomly selects a value x between 0.0 and 1.0, where x is a random variable uniformly distributed between 0.0 and 1.0 (block 524). If x is less than or equal to $Pr_{dn}(n)$, as determined in block 526, then terminal u decreases its transmit power delta by $\Delta P_{du}$ (block 528). Otherwise, if x is greater than $Pr_{dn}(n)$, then terminal u maintains the transmit power delta at the current level (block 530).

If the OSI bit is '0' in block 514, then terminal u determines the probability for increasing the transmit power, $Pr_{up}(n)$, e.g., based on $\Delta P(n-1)$ and $r_{ns}(n)$ (block 532). Terminal u then randomly selects a value x between 0.0 and 1.0 (block 534). If x is less than or equal to $Pr_{up}(n)$, as determined in block 536, then terminal u increases its transmit power delta by $\Delta P_{up}$ (block 538). Otherwise, if x is greater than $Pr_{up}(n)$, then terminal u maintains the transmit power delta at the current level (block 530). The transmit power adjustments in blocks 528, 530, and 538 may be expressed as:

$$\Delta P(n) = \begin{cases} \Delta P(n-1) - \Delta P_{dn}, & \text{if } OSI \text{ bit} = \text{`1'} \text{ AND } x \leq Pr_{dn}(n), \\ \Delta P(n-1) + \Delta P_{up}, & \text{if } OSI \text{ bit} = \text{`0'} \text{ AND } x \leq Pr_{up}(n), \\ \Delta P(n-1), & \text{otherwise.} \end{cases} \quad \text{Eq (16)}$$

$\Delta P_{du}$ and $\Delta P_{up}$ may be the same value (e.g., 0.25 dB, 0.5 dB, 1.0 dB, and so on) or may be different values.

After blocks 528, 530, and 538, terminal u limits the transmit power delta, as shown in equation (13) (block 542). Terminal u then computes the transmit power $P_{dch}(n)$ based on the transmit power delta $\Delta P(n)$ and the reference power level $P_{ref}(n)$, as shown in equation (10) (block 544), and further limits the transmit power $P_{dch}(n)$ to be within the maximum power level, as shown in equation (14) (block 546). Terminal u uses the transmit power $P_{dch}(n)$ for data transmission on the traffic channel.

In an embodiment, the probabilities are computed as follows:

$$Pr_{dn}(n) = f'_{dn}(Pr_{dn,min}, \Delta P(n-1), r_{ns}(n), k_{dn}), \text{ and} \quad \text{Eq (17a)}$$

$$Pr_{up}(n) = f'_{up}(Pr_{up,min}, \Delta P(n-1), r_{ns}(n), k_{up}), \quad \text{Eq (17b)}$$

where $Pr_{dn,min}$ and $Pr_{up,min}$ are minimum values for $Pr_{dn}(n)$ and $Pr_{up}(n)$, respectively; and $f'_{dn}(\ )$ and $f'_{up}(\ )$ are functions to compute $Pr_{dn}(n)$ and $Pr_{up}(n)$, respectively.

Function $f'_{dn}(\ )$ may be defined such that $Pr_{dn}(n)$ is related to both $\Delta P(n-1)$ and $r_{ns}(n)$. If a neighbor sector observes high or excessive interference, then (1) a larger channel gain for the neighbor sector results in a larger $Pr_{dn}(n)$ and (2) a larger value of $\Delta P(n-1)$ results in a larger $Pr_{dn}(n)$. The larger $Pr_{dn}(n)$ results in a higher probability of reducing the transmit power. Function $f'_{up}(\ )$ may be defined such that $Pr_{up}(n)$ is inversely related to both $\Delta P(n-1)$ and $r_{ns}(n)$. If the neighbor sector observes low interference, then (1) a larger channel gain for the neighbor sector results in a smaller $Pr_{up}(n)$ and (2) a larger value of $\Delta P(n-1)$ results in a smaller $Pr_{up}(n)$. The smaller $Pr_{up}(n)$ results in a lower probability of increasing the transmit power.

FIG. 5 shows the processing for one OSI bit from one neighbor sector. A larger value may be used for $Pr_{dn}(n)$ when the neighbor sector observes excessive interference. A smaller value may be used for $Pr_{dn}(n)$ when the neighbor sector observes high interference. Different down probabilities and hence different rates of power adjustment may be obtained, e.g., by using different scaling factors $k_{dn1}$ and $k_{dn2}$ for high and excessive interference, respectively.

In general, various functions may be used to compute the $\Delta P_{dn}(n)$ and $\Delta P_{up}(n)$ step sizes and the $Pr_{dn}(n)$ and $Pr_{up}(n)$ probabilities. A function may be defined based on various parameters such as the current transmit power, the current transmit power delta, the current OTA OSI report, previous OTA OSI reports, channel gains, and so on. Each function may have a different impact on various power control characteristics such as the convergence rate of the transmit power adjustment and the distribution of transmit power deltas for the terminals in the system. The step sizes and probabilities may also be determined based on look-up tables or by some other means.

The transmit power adjustment and/or the admission control described above may also be performed based on QoS class, user priority class, and so on. For example, a terminal using an emergency service and a police terminal may have higher priority and may be able adjust transmit power at a faster rate and/or with larger step sizes than a normal priority user. As another example, a terminal sending voice traffic may adjust transmit power at a slower rate and/or with smaller step sizes.

Terminal u may also vary the manner in which the transmit power is adjusted based on prior OTA OSI reports received from neighbor sectors. For example, terminal u may reduce its transmit power by a particular down step size and/or at a particular rate if a neighbor sector reports excessive interference and may reduce the transmit power by a larger down step size and/or at a faster rate if the neighbor sector continues to report excessive interference. Alternatively or additionally, terminal u may ignore the $\Delta P_{min}$ in equation (13) if a neighbor sector reports excessive interference, or if the neighbor sector continues to report excessive interference.

Various embodiments of power control to mitigate inter-sector interference have been described above. Interference and power control may also be performed in other manners, and this is within the scope of the invention.

In an embodiment, each sector broadcasts its OTA OSI report to the terminals in the neighbor sectors, as described above. The OTA OSI report may be broadcast with sufficient transmit power to achieve the desired coverage in the neighbor sectors. Each terminal may receive the OTA OSI reports from the neighbor sectors and process these OTA OSI reports in a manner to achieve a sufficiently low misdetection rate and a sufficiently low false alarm probability. Misdetection refers to a failure to detect an OSI bit or value that has been transmitted. False alarm refers to erroneous detection of a received OSI bit or value. For example, if an OSI bit is transmitted using BPSK, then a terminal may declare a received OSI bit to be (1) a '0' if the detected OSI bit is below a first threshold, OSI bit<$-B_{th}$, (2) a '1' if the detected OSI bit exceeds a second threshold, OSI bit>$+B_{th}$, and (3) a null bit otherwise, $+B_{th} \le$ OSI bit$\le -B_{th}$. The terminal can typically trade off misdetection rate with false alarm probability by adjusting the thresholds used for detection.

In another embodiment, each sector also broadcasts OTA OSI reports generated by the neighbor sectors to the terminals within its sector. Each sector thus acts a proxy for neighbor sectors. This embodiment can ensure that each terminal can reliably receive the OTA OSI reports generated by the neighbor sectors since the terminal can receive these OTA OSI reports from the serving sector. This embodiment is well suited for an asymmetric network deployment in which sector coverage sizes are not equal. Smaller sectors typically transmit at lower power levels, and the OTA OSI reports broadcast by these smaller sectors may not be reliably received by the terminals in the neighbor sectors. The smaller sectors would then benefit from having their OTA OSI reports broadcast by the neighbor sectors.

In general, a given sector m may broadcast OTA OSI reports generated by any number and any one of the other sectors. In an embodiment, sector m broadcasts OTA OSI reports generated by sectors in a neighbor list for sector m. The neighbor list may be formed by a network operator or in some other manner. In another embodiment, sector m broadcasts OTA OSI reports generated by all sectors that are included in the active sets of the terminals in sector m. Each terminal may maintain an active set that includes all sectors with which the terminal is in communication. Sectors may be added to or removed from the active set as the terminal is handed off from one sector to another. In yet another embodiment, sector m broadcasts OTA OSI reports generated by all sectors that are included in the candidate sets of the terminals in sector m. Each terminal may maintain a candidate set that includes all sectors with which the terminal may communicate. Sectors may be added to or removed from the candidate set, e.g., based on channel gain and/or some other parameter. In yet another embodiment, sector m broadcasts OTA OSI reports generated by all sectors that are included in the OSI sets of the terminals in sector m. The OSI set for each terminal may be defined as described above.

As noted above, the system may utilize only user-based interference control or only network-based interference control. User-based interference control may be simpler to implement since each sector and each terminal can act autonomously. Network-based interference control may provide improved performance since interference control is performed in a coordinated manner. The system may also utilize both user-based and network-based interference control at the same time. The system may also utilize user-based interference control at all times and may invoke network-based interference control only if excessive interference is observed. The system may also invoke each type of interference control for different operating conditions.

Figure 6:
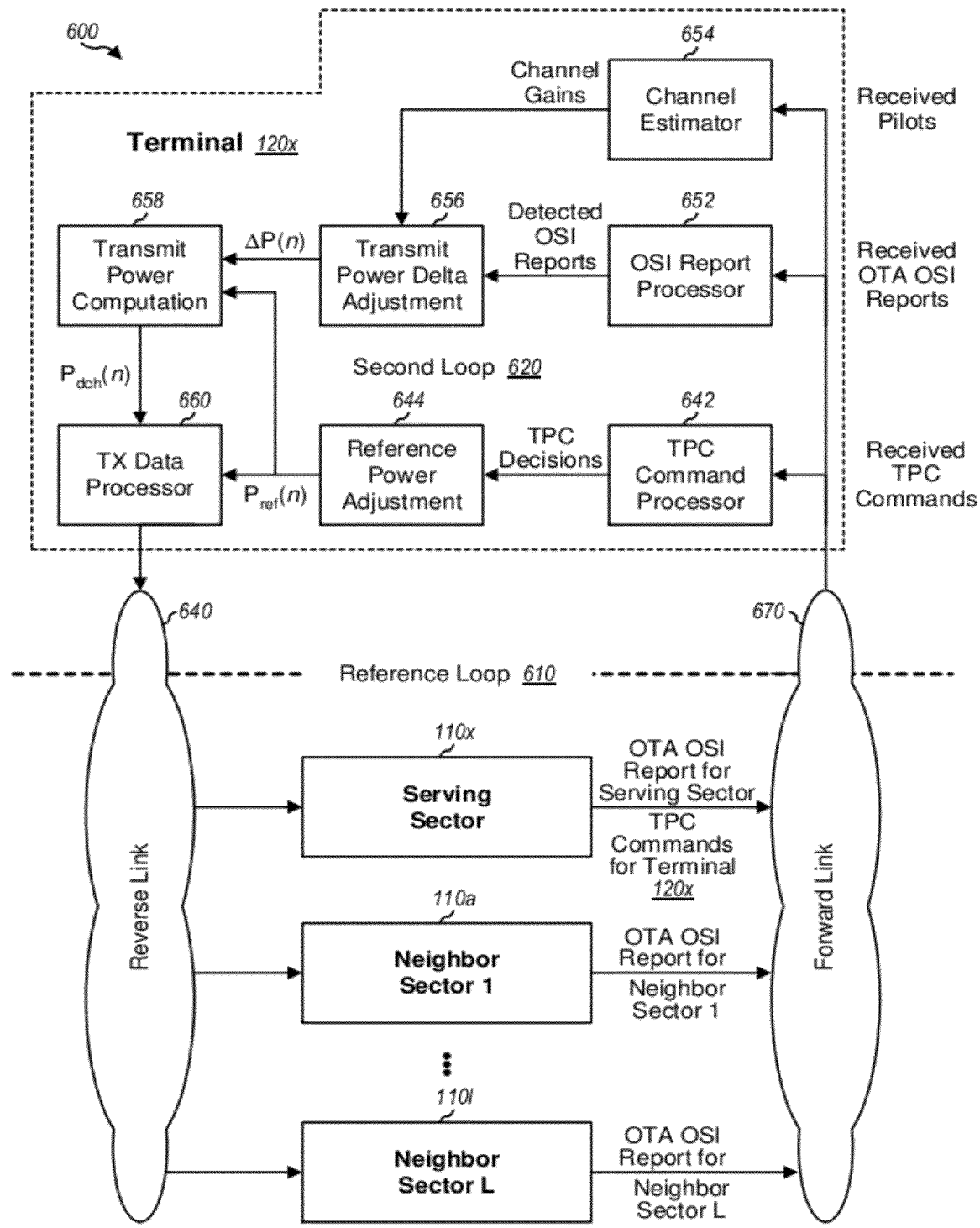
FIG. 6 shows a power control mechanism suitable for interference control.

FIG. 6 shows a power control mechanism 600 that may be used to adjust the transmit power for a terminal 120x in system 100. Terminal 120x communicates with a serving sector 110x and may cause interference to neighbor sectors 110a through 110l. Power control mechanism 600 includes (1) a reference loop 610 that operates between terminal 120x and serving sector 110x and (2) a second loop 620 that operates between terminal 120x and neighbor sectors 110a through 110l. Reference loop 610 and second loop 620 may operate concurrently but may be updated at different rates, with reference loop 610 being a faster loop than second loop 620. For simplicity, FIG. 6 shows only the portion of loops 610 and 620 residing at terminal 120x.

Reference loop 610 adjusts the reference power level $P_{ref}$(n) such that the received SNR for the designated transmission, as measured at serving sector 110x, is as close as possible to the target SNR. For reference loop 610, serving sector 110x estimates the received SNR for the designated transmission, compares the received SNR against the target SNR, and generates transmit power control (TPC) commands based on the comparison results. Each TPC command may be either (1) an UP command to direct an increase in the reference power level or (2) a DOWN command to direct a decrease in the reference power level. Serving sector 110x transmits the TPC commands on the forward link (cloud 670) to terminal 120x.

At terminal 120x, a TPC command processor 642 detects the TPC commands transmitted by serving sector 110x and provides TPC decisions. Each TPC decision may be an UP decision if a received TPC command is deemed to be an UP command or a DOWN decision if the received TPC command is deemed to be an DOWN command. A reference power adjustment unit 644 adjusts the reference power level based on the TPC decisions. Unit 644 may increase $P_{ref}$(n) by an up step for each UP decision and decrease $P_{ref}$(n) by a down step for each DOWN decision. A transmit (TX) data processor 660 scales the designated transmission to achieve the reference power level. Terminal 120x sends the designated transmission to serving sector 110x.

Due to path loss, fading, and multipath effects on the reverse link (cloud 640), which typically vary over time and especially for a mobile terminal, the received SNR for the designated transmission continually fluctuates. Reference loop 610 attempts to maintain the received SNR for the designated transmission at or near the target SNR in the presence of changes in the reverse link channel conditions.

Second loop 620 adjusts the transmit power $P_{dch}$(n) for a traffic channel assigned to terminal 120x such that a power level that is as high as possible is used for the traffic channel while keeping inter-sector interference to within acceptable levels. For second loop 620, each neighbor sector 110 receives transmissions on the reverse link, estimates the inter-sector interference observed by the neighbor sector from the terminals in other sectors, generates an OTA OSI report based on the interference estimate, and broadcasts the OTA OSI report to the terminals in the other sectors.

At terminal 120x, an OSI report processor 652 receives the OTA OSI reports broadcast by the neighbor sectors and provides detected OSI reports to a transmit power delta computation unit 656. A channel estimator 654 receives pilots from the serving and neighbor sectors, estimates the channel gain for each sector, and provides the estimated channel gains for all sectors to unit 656. Unit 656 determines the channel gain ratios for the neighbor sectors and further adjusts the transmit power delta $\Delta P$(n) based on the detected OSI reports and the channel gain ratios, as described above. Unit 656 may implement processes 300, 400 and/or 500 shown in FIGS. 3 through 5. A transmit power computation unit 658 computes the transmit power $P_{dch}(n)$ based on the reference transmit level $P_{ref}(n)$ from unit 644, the transmit power delta $\Delta P(n)$ from unit 656, and possibly other factors. TX data processor 660 uses the transmit power $P_{dch}(n)$ for data transmission to serving sector 110x.

FIG. 6 shows an exemplary power control mechanism that may be used for interference control. Interference control may also be performed in other manners and/or with different parameters than those described above.

Figure 7:
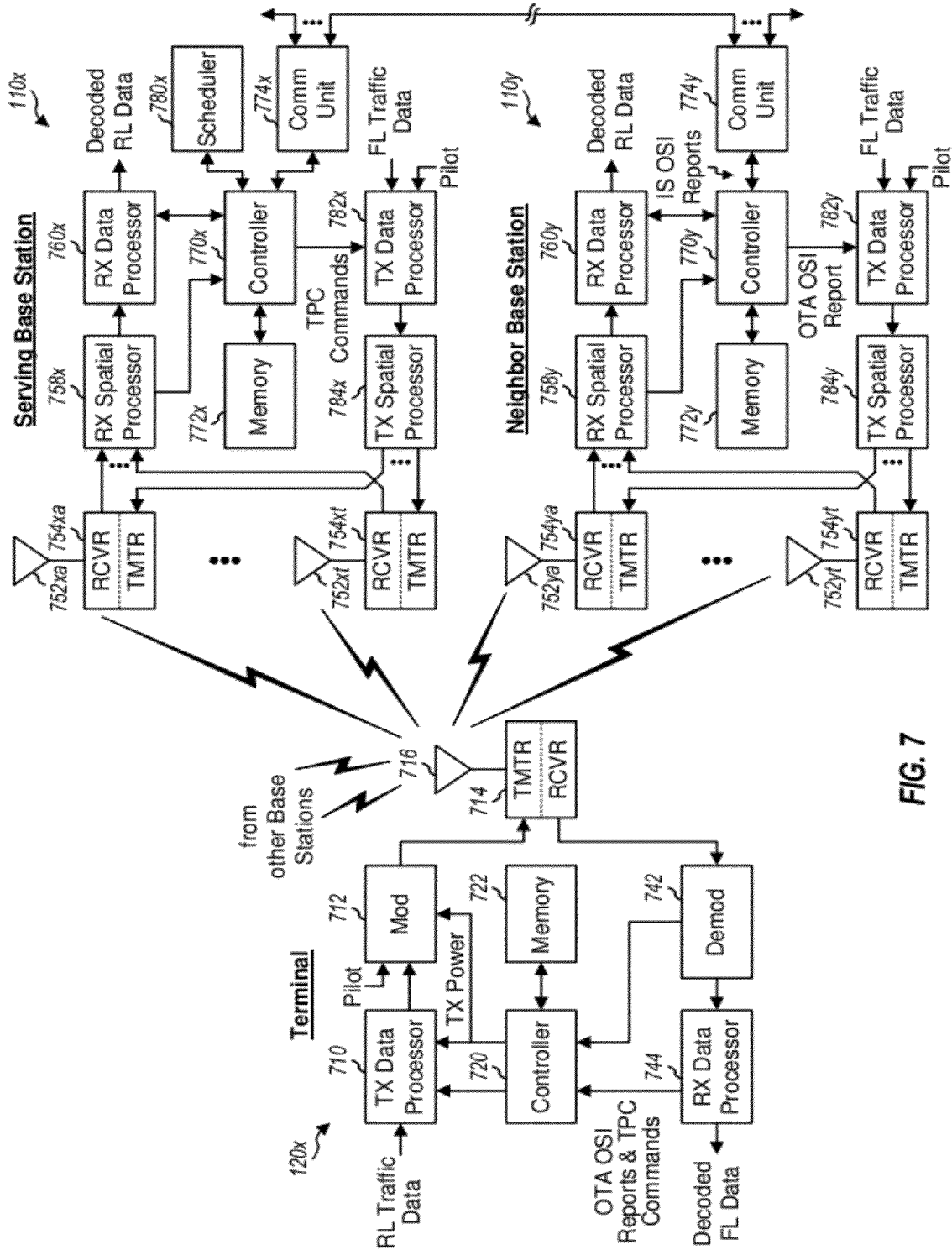
FIG. 7 shows a block diagram of a terminal and two base stations.

FIG. 7 shows a block diagram of an embodiment of terminal 120x, serving base station 110x, and neighbor base station 110y. For clarity, the following description assumes the use of power control mechanism 600 shown in FIG. 6.

On the reverse link, at terminal 120x, a TX data processor 710 encodes, interleaves, and symbol maps reverse link (RL) traffic data and control data and provides data symbols. A modulator (Mod) 712 maps the data symbols and pilot symbols onto the proper subbands and symbol periods, performs OFDM modulation if applicable, and provides a sequence of complex-valued chips. A transmitter unit (TMTR) 714 conditions (e.g., converts to analog, amplifies, filters, and frequency upconverts) the sequence of chips and generates a reverse link signal, which is transmitted via an antenna 716.

At serving base station 110x, multiple antennas 752xa through 752xt receive the reverse link signals from terminal 120x and other terminals. Each antenna 752x provides a received signal to a respective receiver unit (RCVR) 754x. Each receiver unit 754x conditions (e.g., filters, amplifies, frequency downconverts, and digitizes) its received signal, performs OFDM demodulation if applicable, and provides received symbols. An RX spatial processor 758 performs receiver spatial processing on the received symbols from all receiver units and provides data symbol estimates, which are estimates of the transmitted data symbols. An RX data processor 760x demaps, deinterleaves, and decodes the data symbol estimates and provides decoded data for terminal 120x and other terminals currently served by base station 110x.

The processing for a forward link transmission may be performed similarly to that described above for the reverse link. The processing for the transmissions on the forward and reverse links is typically specified by the system.

For interference and power control, at serving base station 110x, RX spatial processor 758x estimates the received SNR for terminal 120x, estimates the inter-sector interference observed by base station 110x, and provides an SNR estimate for terminal 110x and an interference estimate (e.g., the measured interference $I_{meas,m}$) to a controller 770x. Controller 770x generates TPC commands for terminal 120x based on the SNR estimate for the terminal and the target SNR. Controller 770x may generate an OTA OSI report and/or an IS OSI report based on the interference estimate. Controller 770x may also receive IS OSI reports from neighbor sectors via a communication (Comm) unit 774x. The TPC commands, the OTA OSI report for base station 110x, and possibly OTA OSI reports for other sectors are processed by a TX data processor 782x and a TX spatial processor 784x, conditioned by transmitter units 754xa through 754xt, and transmitted via antennas 752xa through 752xt. The IS OSI report from base station 110x may be sent to the neighbor sectors via communication unit 774x.

At neighbor base station 110y, an RX spatial processor 758y estimates the inter-sector interference observed by base station 110y and provides an interference estimate to controller 770y. Controller 770y may generate an OTA OSI report and/or an IS OSI report based on the interference estimate. The OTA OSI report is processed and broadcast to the terminals in the system. The IS OSI report may be sent to the neighbor sectors via a communication unit 774y.

At terminal 120x, antenna 716 receives the forward link signals from the serving and neighbor base stations and provides a received signal to a receiver unit 714. The received signal is conditioned and digitized by receiver unit 714 and further processed by a demodulator (Demod) 742 and an RX data processor 744. Processor 744 provides the TPC commands sent by serving base station 110x for terminal 120x and the OTA OSI reports broadcast by the neighbor base stations. A channel estimator within demodulator 742 estimates the channel gain for each base station. Controller 720 detects the received TPC commands and updates the reference power level based on the TPC decisions. Controller 720 also adjusts the transmit power for the traffic channel based on the OTA OSI reports received from the neighbor base stations and the channel gains for the serving and neighbor base stations. Controller 720 provides the transmit power for the traffic channel assigned to terminal 120x. Processor 710 and/or modulator 712 scales the data symbols based on the transmit power provided by controller 720.

Controllers 720, 770x, and 770y direct the operations of various processing units at terminal 120x and base station 110x and 110y, respectively. These controllers may also perform various functions for interference and power control. For example, controller 720 may implement any or all of units 642 through 658 shown in FIG. 6 and/or processes 300, 400 and/or 500 shown in FIGS. 3 through 5. Controller 770 for each base station 110 may implement all or a portion of process 200 in FIG. 2. Memory units 722, 772x, and 772y store data and program codes for controllers 720, 770x, and 770y, respectively. A scheduler 780x schedules terminals for communication with base station 110x and also assigns traffic channels to the scheduled terminals, e.g., based on the IS OSI reports from the neighbor base stations.

The interference control techniques described herein may be implemented by various means. For example, these techniques may be implemented in hardware, software, or a combination thereof. For a hardware implementation, the processing units used to perform interference control at a base station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used to perform interference control at a terminal may also be implemented within one or more ASICs, DSPs, processors, electronic devices, and so on.

For a software implementation, the interference control techniques may be implemented with modules (e.g., procedures, functions, and so on) that perform the functions described herein. The software codes may be stored in a memory unit (e.g., memory unit 722, 772x, or 772y in FIG. 7) and executed by a processor (e.g., controller 720, 770x, or 770y). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for interference control, the method being implemented by a sector, the method comprising:
    obtaining a measured interference that represents an estimate of interference observed at the sector due to transmissions from terminals in other sectors;
    generating an interference report based on the measured interference, wherein the interference report conveys the measured interference for the sector relative to multiple interference thresholds; and
    broadcasting the interference report to the terminals in the other sectors.

2. The method of claim 1, wherein the measured interference is a measured interference-over-thermal.

3. The method of claim 1, further comprising broadcasting interference reports received from other sectors to terminals being served by the sector.

4. A method for interference control, the method being implemented by a terminal, the method comprising:
    receiving an interference report that is broadcast by a neighbor sector, wherein the interference report conveys measured interference for the neighbor sector relative to multiple interference thresholds; and
    adjusting transmit power of the terminal based on the interference report.

5. The method of claim 4, further comprising:
    receiving multiple interference reports from multiple neighbor sectors; and
    identifying a strongest neighbor sector;
    wherein the transmit power of the terminal is adjusted based only on the interference report from the strongest neighbor sector.

6. The method of claim 4, further comprising receiving multiple interference reports from multiple neighbor sectors, wherein the transmit power of the terminal is adjusted based only on the interference reports from the neighbor sectors that are included in an other-sector interference set.

7. The method of claim 6, wherein adjusting the transmit power comprises decreasing the transmit power if any neighbor sector in the other-sector interference set observes high or excessive interference.

8. The method of claim 6, wherein adjusting the transmit power comprises:
    determining a transmit power adjustment for each neighbor sector in the other-sector interference set; and
    combining transmit power adjustments for all neighbor sectors in the other-sector interference set to obtain an overall transmit power adjustment.

9. A sector that is configured for interference control, comprising:
    a processor;
    memory in electronic communication with the processor; and
    instructions stored in the memory, the instructions being executable to:
        obtain a measured interference that represents an estimate of interference observed at the sector due to transmissions from terminals in other sectors;
        generate an interference report based on the measured interference, wherein the interference report conveys the measured interference for the sector relative to multiple interference thresholds; and
        broadcast the interference report to the terminals in the other sectors.

10. The sector of claim 9, wherein the measured interference is a measured interference-over-thermal.

11. The sector of claim 9, wherein the instructions are also executable to broadcast interference reports received from other sectors to terminals being served by the sector.

12. A terminal configured for interference control, comprising:
    a processor;
    memory in electronic communication with the processor; and
    instructions stored in the memory, the instructions being executable to:
        receive an interference report that is broadcast by a neighbor sector, wherein the interference report conveys measured interference for the neighbor sector relative to multiple interference thresholds; and
        adjust transmit power of the terminal based on the interference report.

13. The terminal of claim 12, wherein the instructions are also executable to receive multiple interference reports from multiple neighbor sectors and to identify a strongest neighbor sector, wherein the transmit power of the terminal is adjusted based only on the interference report from the strongest neighbor sector.

14. The terminal of claim 12, wherein the instructions are also executable to receive multiple interference reports from multiple neighbor sectors, and wherein the transmit power of the terminal is adjusted based only on the interference reports from the neighbor sectors that are included in an other-sector interference set.

15. The terminal of claim 14, wherein adjusting the transmit power comprises decreasing the transmit power if any neighbor sector in the other-sector interference set observes high or excessive interference.

16. The terminal of claim 14, wherein adjusting the transmit power comprises:
    determining a transmit power adjustment for each neighbor sector in the other-sector interference set; and
    combining transmit power adjustments for all neighbor sectors in the other-sector interference set to obtain an overall transmit power adjustment.

17. A sector that is configured for interference control, comprising:
    means for obtaining a measured interference that represents an estimate of interference observed at the sector due to transmissions from terminals in other sectors;
    means for generating an interference report based on the measured interference, wherein the interference report conveys the measured interference for the sector relative to multiple interference thresholds; and
    means for broadcasting the interference report to the terminals in the other sectors.

18. A terminal that is configured for interference control, comprising:
    means for receiving an interference report that is broadcast by a neighbor sector, wherein the interference report conveys measured interference for the neighbor sector relative to multiple interference thresholds; and
    means for adjusting transmit power of the terminal based on the interference report.

19. The terminal of claim 18, further comprising:
    means for receiving multiple interference reports from multiple neighbor sectors; and
    means for identifying a strongest neighbor sector;
    wherein the transmit power of the terminal is adjusted based only on the interference report from the strongest neighbor sector.

20. The terminal of claim 18, further comprising means for receiving multiple interference reports from multiple neighbor sectors, wherein the transmit power of the terminal is adjusted based only on the interference reports from the neighbor sectors that are included in an other-sector interference set.

21. A non-transitory processor-readable storage medium, comprising:
 code for causing a sector to obtain a measured interference that represents an estimate of interference observed at the sector due to transmissions from terminals in other sectors;
 code for causing the sector to generate an interference report based on the measured interference, wherein the interference report conveys the measured interference for the sector relative to multiple interference thresholds; and
 code for causing the sector to broadcast the interference report to the terminals in the other sectors.

22. A non-transitory processor-readable storage medium, comprising:
 code for causing a terminal to receive an interference report that is broadcast by a neighbor sector, wherein the interference report conveys measured interference for the neighbor sector relative to multiple interference thresholds; and
 code for causing the terminal to adjust transmit power of the terminal based on the interference report.

23. The processor-readable storage medium of claim 22, further comprising:
 code for causing the terminal to receive multiple interference reports from multiple neighbor sectors; and
 code for causing the terminal to identify a strongest neighbor sector;
 wherein the transmit power of the terminal is adjusted based only on the interference report from the strongest neighbor sector.

24. The processor-readable storage medium of claim 22, further comprising code for causing the terminal to receive multiple interference reports from multiple neighbor sectors, wherein the transmit power of the terminal is adjusted based only on the interference reports from the neighbor sectors that are included in an other-sector interference set.

* * * * *